United States Patent [19]

Nishino et al.

[11] Patent Number: 5,659,472

[45] Date of Patent: Aug. 19, 1997

[54] MOTOR CONTROLLER

[75] Inventors: Kazuhisa Nishino; Hirohisa Awa; Shunichi Wada, all of Hyogo-ken, Japan

[73] Assignee: Mitsubishi Denki Kabushiki Kaisha, Tokyo, Japan

[21] Appl. No.: 519,940

[22] Filed: Aug. 28, 1995

[30] Foreign Application Priority Data

Aug. 31, 1994 [JP] Japan .................. 6-207189

[51] Int. Cl.[6] .................................................. B60K 41/00
[52] U.S. Cl. ............................................. 364/424.051
[58] Field of Search ....................... 364/424.05, 424.051, 364/424.053; 180/79.1, 142; 388/820; 318/432

[56] References Cited

U.S. PATENT DOCUMENTS

| 4,392,540 | 7/1983 | Michio et al. | 180/142 |
|---|---|---|---|
| 4,582,155 | 4/1986 | Ohe | 180/79.1 |
| 4,650,019 | 3/1987 | Yanai et al. | 180/79.1 |
| 4,719,396 | 1/1988 | Shimizu | 318/432 |
| 4,736,810 | 4/1988 | Morishita et al. | 180/79.1 |
| 4,745,984 | 5/1988 | Shimizu | 180/79.1 |
| 4,837,692 | 6/1989 | Shimizu | 364/424.05 |
| 4,855,655 | 8/1989 | Shimizu | 388/820 |
| 5,040,629 | 8/1991 | Matsuoka et al. | 180/79.1 |
| 5,097,420 | 3/1992 | Morishita | 364/424.05 |
| 5,404,960 | 4/1995 | Wada et al. | 180/79.1 |

FOREIGN PATENT DOCUMENTS 4-31171  2/1992  Japan .

Primary Examiner—Kevin J. Teska
Assistant Examiner—Stephen J. Walder, Jr.
Attorney, Agent, or Firm—Sughrue, Mion, Zinn, Macpeak & Seas

[57] ABSTRACT

[Object] To improve system reliability and safety. [Constitution] The rotation speed of the motor 6 is detected by the motor rotation speed detection circuit 17 and the amount of rotation of the motor 6 is calculated from the detected rotation speed by the motor rotation amount calculating means 10a. Then, a fault is determined when the amount of rotation exceeds a predetermined value and the drive of the motor 6 is stopped by the motor stopping means 123.

12 Claims, 21 Drawing Sheets

MOTOR CONTROLLER

BACKGROUND OF THE INVENTION

1. Field of the Invention

This invention relates to a motor controller for driving a motor whose rotation range is set and, more specifically, to a motor controller for use in an electric power steering controller which helps control a steering wheel, for example.

2. Description of the Prior Art

Motor controllers for driving a motor whose rotation range is set include an electric power steering controller which helps control a steering wheel, for example. In this electric power steering controller, the amount of motor rotation is determined by the rotation degree of a steering wheel.

Heretofore, fault detection means for use in such a controller as disclosed in Japanese Patent Publication No. 4-31171 has been proposed.

FIG. 21 shows the substantial configuration of an electric power steering controller of the prior art. This electric power steering controller comprises a motor 6 for assisting steering force, a clutch 7 interposed between the motor 6 and a steering system, a torque sensor 4 for detecting the input torque of the steering shaft, and a control unit 1 connected to a speed sensor 5 for detecting the speed of a vehicle. The control unit 1 is also connected to a battery (main power source) 2 and a key switch 3.

The control unit 1 comprises a motor drive circuit 14 having a bridge circuit 34 which consists of power transistors 30, 31, 32, 33 and a current detecting resistor 35 on the current flow-out side of the bridge circuit 34, and the transistors 30, 31, 32, 33 constituting the bridge circuit 34 are controlled by a CPU 10. The current detecting resistor 35 is connected to the CPU 10 through motor current detection means 15. A clutch drive circuit 16 for driving the clutch 7 is also connected to the CPU 10. One terminal of the motor 6 is connected to one input terminal of a differential amplifier 22 and the other terminal of the motor 6 is connected to the other input terminal of the differential amplifier 22 through an offset circuit 23. The output terminal of the differential amplifier 22 is connected to the CPU 10 so that a voltage at both terminals of the motor 6 is supplied to the CPU from the differential amplifier 22 as a positive or negative value with respect to an offset amount according to the rotation direction of the motor 6.

In the above-described electric power steering controller, the motor drive circuit 14 compares a motor application voltage to be applied to the motor 6 with a voltage at both terminals of the motor supplied from the differential amplifier 22 in response to a control signal from the CPU 10 so as to detect a fault in the motor drive circuit 1 based on the difference between them. When a fault is detected, fail-safe processing is performed to turn off the relay contact of an unshown fail-safe relay circuit. With such a configuration, it is possible to detect a fault in wiring as well as a fault in the elements of the motor drive circuit 14.

However, in an electric power steering controller comprising the motor drive circuit 14 shown in FIG. 21 in which a motor current is detected by the current detection resistor 35 provided on the current flow-out side of the bridge circuit 34, when the power transistor 30 of the motor drive circuit 14 is PWM driven, the power transistor 33 is fixed at an "ON" position, and the power transistors 31 and 32 are turned off to drive the motor 6, it is difficult to detect a fault because a detected voltage value between the motor terminals changes little even if the motor terminal connected between the power transistors 32 and 33 is grounded. Further, since a circuit for detecting a voltage between motor terminals requires high detection accuracy, precision parts are used to enhance detection accuracy with the result of boosted costs. Moreover, when a motor terminal is grounded having a contact resistance under the above condition, a motor current smaller than a current running through the motor 6 is detected since the motor current is split by the current detection resistor 35 and the above-described contact resistance. As the result, over-assistance is provided by the motor 6, and hence, the steering wheel becomes lighter.

If the current detection resistor 35, not shown, is provided on the current flow-in side of the bridge circuit 34, when the power transistor 30 of the motor drive circuit 14 is PWM driven, the power transistor 33 is fixed at an "ON" position, and the power transistors 31 and 32 are turned off to drive the motor 6, the steering wheel becomes lighter as well even if the motor terminal connected between the power transistors 30 and 31 is short-circuited to the positive side of a power source (referred to as "short-circuited" hereinafter).

SUMMARY OF THE INVENTION

The present invention has been made to solve the above-described problems, and it is therefore an object of the invention to provide a motor controller which can improve reliability and safety.

Another object of the invention is to provide an inexpensive system by eliminating the need for a sensor for detecting the rotation speed of a motor, improve reliability and safety by stopping the drive of the motor only when a fault is serious and continuing the normal operation of the motor with regard to an insignificant fault, further improve reliability and safety by determining a fault in the motor each time the motor is not driven and stopping the drive of the motor, prevent the CPU from being reset by a reduction in power voltage, deterioration in system performance by stopping the drive of the motor only for a predetermined time period, and the halt of the motor caused by noise in power line or the like by comparing a motor power voltage with a control power voltage, and further improve reliability and safety by controlling a system efficiently in disregard of the rotation speed of the motor when a leak of a level that does not affect control occurs due to waterdrops adhered to motor terminals or the like.

A first aspect of the invention is characterized in that there are provided motor rotation amount calculating means for calculating the amount of motor rotation from the rotation speed of the motor and motor stopping means for determining a fault when the amount of rotation exceeds a predetermined value and stopping the drive of the motor.

A second aspect of the invention is characterized in that there are provided motor rotation speed estimation means for estimating the rotation speed of the motor from a motor current detected by the motor current detection means and a motor application voltage applied to the motor by the motor drive means, motor rotation amount calculating means for calculating the amount of motor rotation from the estimated rotation speed of the motor, and motor stopping means for determining a fault when the amount of motor rotation exceeds a predetermined value and stopping the drive of the motor.

A third aspect of the invention is characterized in that there are provided motor rotation speed estimation means for estimating the rotation speed of the motor from a motor current detected by the motor current detection means and a motor application voltage detected by the motor application voltage detection means, motor rotation amount calculating means for calculating the amount of motor rotation from the estimated rotation speed of the motor, and motor stopping means for determining a fault when the amount of motor rotation exceeds a predetermined value and stopping the drive of the motor.

A fourth aspect of the invention is characterized in that there are provided motor rotation speed estimation means for estimating the rotation speed of the motor from a motor terminal voltage detected by the motor terminal voltage detection means when the motor is not driven, motor rotation amount calculating means for calculating the amount of motor rotation from the estimated rotation speed of the motor, and motor stopping means for determining a fault when the amount of rotation exceeds a predetermined value and stopping the drive of the motor.

A fifth aspect of the invention is characterized in that there is provided motor stopping means for stopping the drive of the motor when the rotation speed of the motor estimated from a motor terminal voltage detected when the motor is not driven exceeds a predetermined value in the construction of the fourth aspect of the invention.

A sixth aspect of the invention is characterized in that there is provided motor stopping means for stopping the drive of the motor for a predetermined time period when a power voltage detected by the power voltage detection means falls below a predetermined value.

A seventh aspect of the invention is characterized in that there are provided filtering means for filtering a power voltage detected by the power voltage detection means and motor stopping means for stopping the drive of the motor for a predetermined time period when the difference between a power voltage detected by the power voltage detection means and a power voltage filtered by the filtering means exceeds a predetermined value.

An eighth aspect of the invention is characterized in that there is provided motor stopping means for stopping the drive of the motor for a predetermined time period when a motor power voltage detected by the motor power voltage detection means is larger than a control power voltage detected by the control power voltage detection means by a predetermined value.

A ninth aspect of the invention is characterized in that the amount of motor rotation is calculated when the rotation speed of the motor exceeds a predetermined value in the construction of the first, second, third or fourth aspect of the invention.

According to the first aspect of the invention, the amount of motor rotation is calculated from the rotation speed of the motor by the motor rotation amount calculating means so that a fault is determined when the amount of rotation exceeds a predetermined value and the drive of the motor is stopped by the motor stopping means.

According to the second aspect of the invention, the rotation speed of the motor is estimated from a motor current and a motor application voltage by the rotation speed estimation means and the amount of motor rotation is calculated from the estimated rotation speed by the motor rotation amount calculating means so that a fault is determined when the amount of rotation exceeds a predetermined value and the drive of the motor is stopped by the motor stopping means.

According to the third aspect of the invention, the rotation speed is estimated from a motor current and a motor application voltage by the motor rotation speed estimation means and the amount of motor rotation is calculated from the estimated rotation speed by the motor rotation amount calculating means so that a fault is determined when the amount of rotation exceeds a predetermined value and the drive of the motor is stopped by the motor stopping means.

According to the fourth aspect of the invention, the rotation speed of the motor is estimated by the motor rotation speed estimation means from a motor terminal voltage detected by the motor terminal voltage detection means when the motor is not driven and the amount of motor rotation is calculated from the estimated rotation speed by the motor rotation amount calculating means so that a fault is determined when the amount of rotation exceeds a predetermined value and the drive of the motor is stopped by the motor stopping means.

According to the fifth aspect of the invention, the drive of the motor is stopped by the motor stopping means when the rotation speed of the motor estimated from a motor terminal voltage detected when the motor is not driven exceeds a predetermined value.

According to the sixth aspect of the invention, the drive of the motor is stopped for a predetermined time period by the motor stopping means when a power voltage detected by the power voltage detection means falls below a predetermined value.

According to the seventh aspect of the invention, a power voltage detected by the power voltage detection means is filtered by the filtering means and the drive of the motor is stopped by the motor stopping means for a predetermined time period when the difference between a power voltage detected by the power voltage detection means and a power voltage filtered by the filtering means exceeds a predetermined value.

According to the eighth aspect of the invention, the drive of the motor is stopped by the motor stopping means for a predetermined time period when a motor power voltage detected by the motor power voltage detection means is larger than a control power voltage detected by the control power voltage detection means by a predetermined value.

According to the ninth aspect of the invention, the amount of motor rotation is calculated when the rotation speed of the motor exceeds a predetermined value.

The above and other objects, features and advantages of the invention will become more apparent from the following description when taken into conjunction with the accompanying drawings.

BRIEF DESCRIPTION OF THE INVENTION

DESCRIPTION OF THE PREFERRED EMBODIMENT

Embodiment 1

Figure 1:
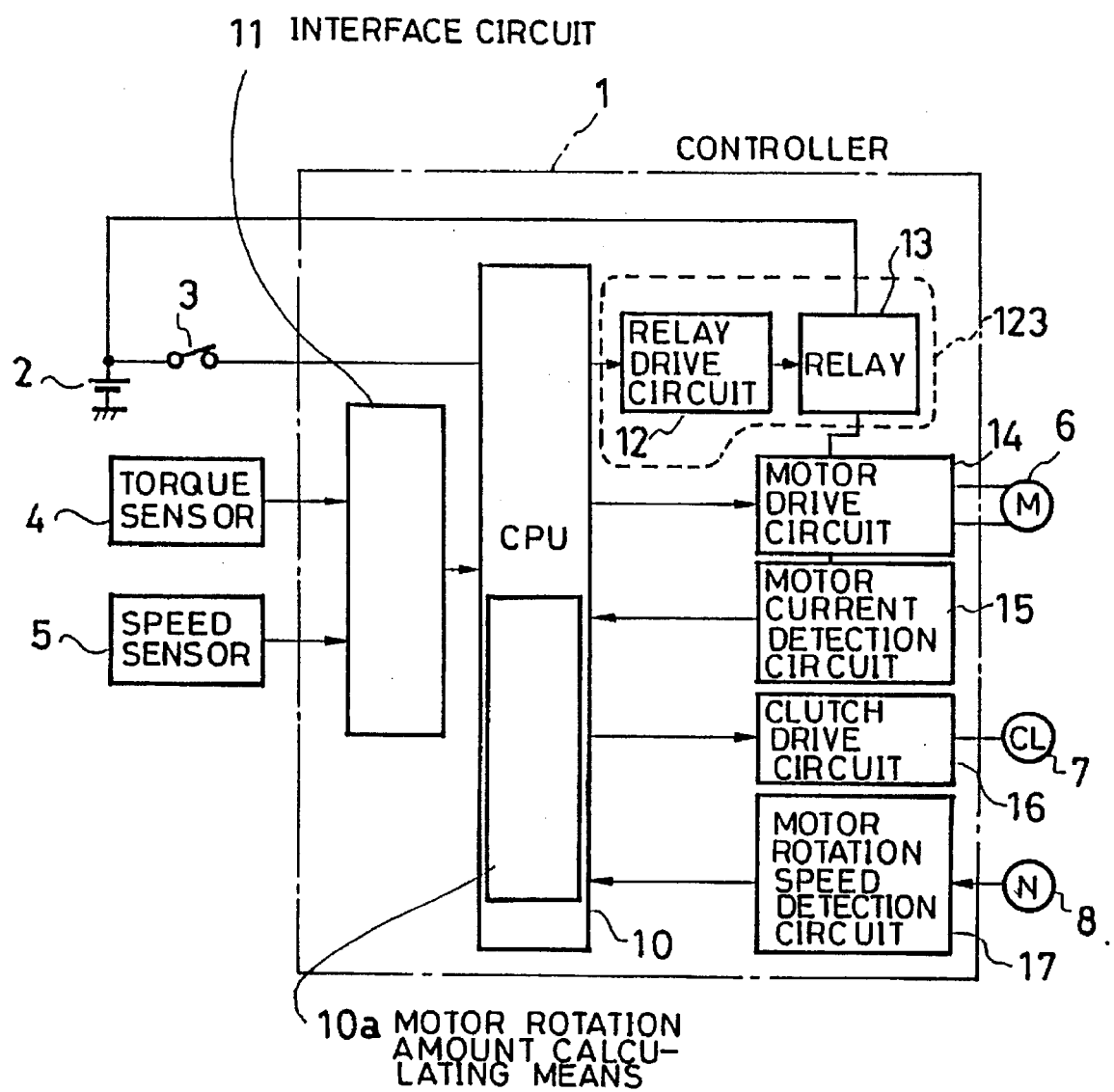
FIG. 1 is a block diagram of the substantial configuration of an electric power steering controller as a motor controller according to Embodiment 1 of the invention.

FIG. 1 is a block diagram of the substantial configuration of an electric power steering controller as a motor controller according to Embodiment 1 of the invention. This electric power steering controller comprises a motor 6 for assisting steering force, a clutch 7 interposed between the motor 6 and a steering system, a motor rotation speed sensor 8 for detecting the rotation speed of the motor 6, a torque sensor 4 for detecting the input torque of a steering shaft, a speed sensor 5 for detecting the speed of a vehicle, and a control unit 1 connected to these elements. Further, the control unit 1 is connected to a battery 2 and a key switch 3.

The control unit 1 comprises an interface circuit 11 for receiving detection signals from the torque sensor 4 and the speed sensor 5, a relay 13 capable of cutting off power supply, a relay drive circuit 12 for driving the relay 13 to supply motor power (battery 2) to a motor drive circuit 14, the motor drive circuit 14 for driving the motor 6 with the motor power (battery 2) supplied through the relay 13, a motor current detection circuit 15 for detecting a motor current running through the motor 6, a clutch drive circuit 16 for driving the clutch 7, a motor rotation speed detection circuit 17 for receiving a signal from the motor rotation speed sensor 8, and a CPU 10 for controlling these input and output signals. The relay drive circuit 12 turns on (magnetization) and off (magnetization release) the relay 13 in accordance with an instruction from the CPU 10, and when the relay 13 is turned on, power is supplied to the motor 6 from the battery 2 through the motor drive circuit 14. The relay drive circuit 12 and the relay 13 constitute motor stopping means 123. Motor rotation amount calculating means 10a within the CPU 10 calculates the amount of motor rotation from the rotation speed of the motor. Generally speaking, the electric power steering controller determines a target current to run through the motor 6 from a torque value detected by the torque sensor 4 and a speed value detected by the speed sensor 5 and performs constant current control so that a current running through the motor 6 becomes a target value.

Whether the sensor for detecting the rotation speed of the motor and the motor rotation speed detection circuit 17 are faulty or not is determined as follows.

(1) The motor drive circuit 14 supplies power to the motor 6 to drive the motor in accordance with an instruction from the CPU 10. A motor current running through the motor 6 is detected by the motor current detection circuit 15 and a drive torque of the motor 6 is obtained from the motor current so that whether the drive torque is the rotation torque of the motor 6 is determined. If a value of the rotation speed of the motor detected by the motor rotation speed detection circuit 17 is zero when it is determined from the drive torque of the motor 6 that the motor 6 rotates, it is determined that the sensor for detecting the rotation speed of the motor, the motor rotation speed detection circuit 17, or the lock of the motor 6 is faulty.

(2) Whether the motor 6 rotates or not is determined from an instruction value supplied to the motor drive circuit 14 from the CPU 10. If a value of the rotation speed of the motor detected by the motor rotation speed detection circuit 17 is zero when it is determined that the motor 6 rotates, it is determined that the sensor for detecting the rotation speed of the motor, the motor rotation speed detection circuit 17, or the lock of the motor 6 is faulty.

Figure 2:
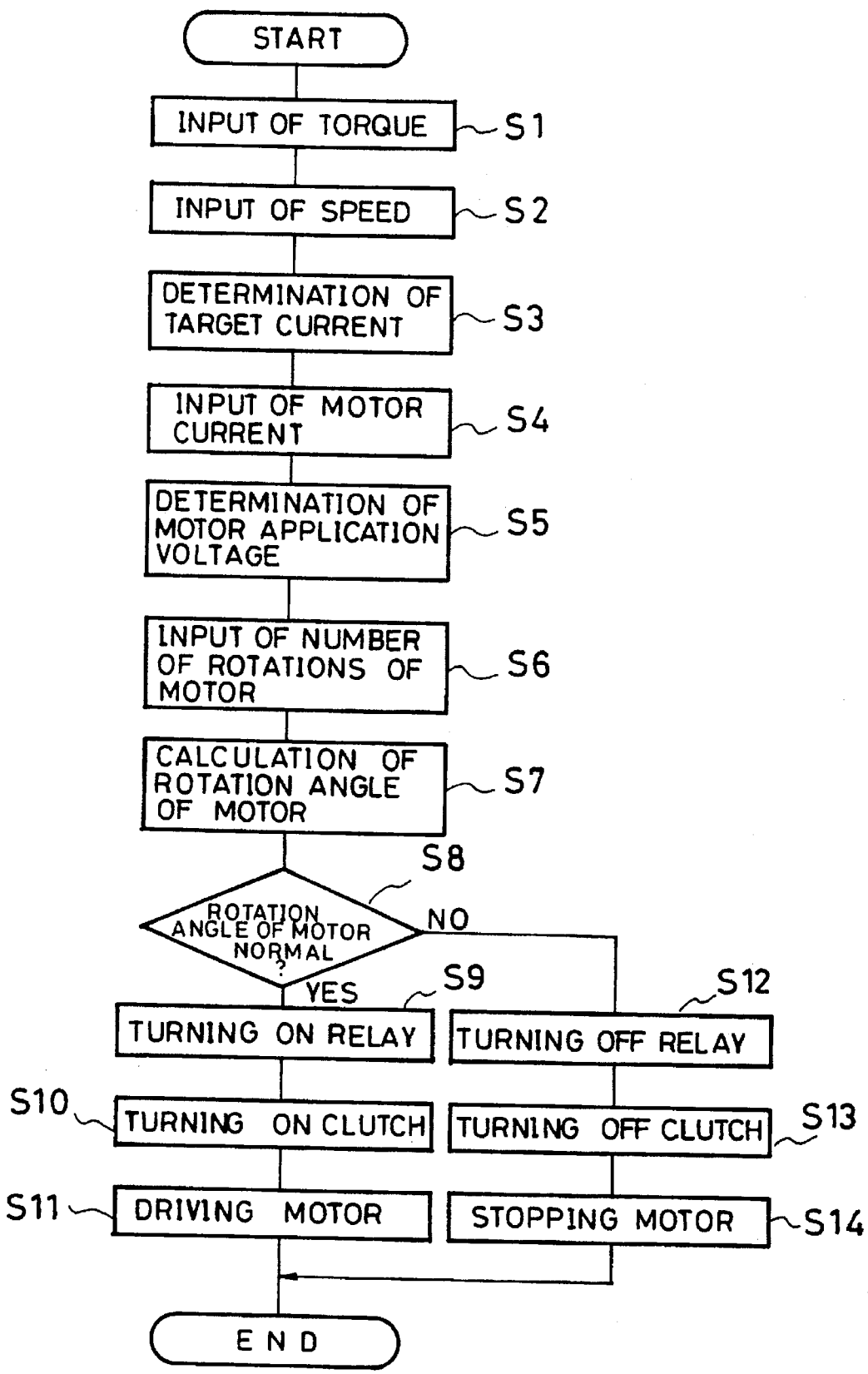
FIG. 2 is a flow chart explaining the operation of Embodiment 1.

A description is subsequently given of the operation of Embodiment 1 of the invention with reference to a flow chart of FIG. 2. A torque detected by the torque sensor 4 and a speed detected by the speed sensor 5 are input into the CPU 10 through the interface circuit 11 (steps S1 and S2). A target current value is then determined based on a predetermined map in accordance with the input torque and speed (step S3). A motor current detected by the motor current detection circuit 15 is input into the CPU 10 (step S4) and the difference between the motor current and the target current value determined in the step S3 is calculated to determine a motor application voltage based on this difference (step S5). Thereafter, a detection signal from the motor rotation speed sensor 8 is input into the the CPU 10 through the motor rotation speed detection circuit 17 (step S6) and the motor rotation speed is integrated (calculated) to obtain the rotation degree of the motor (step S7). The rotation speed of the motor input in the step S6 has positive or negative polarity according to the rotation direction thereof. In step S8, it is determined whether the rotation degree of the motor is regular or irregular, and if the degree is in the regular range (for example, below the maximum rotation degree of the motor 6 (28,800 degrees for 80 rotations)), a relay-on signal is output from the CPU 10 to the relay drive circuit 12 in step S9, the clutch 7 is turned on in step S10, and a motor application voltage determined in the step S5 is output from the CPU 10 to the motor drive circuit 14 in step S11. If the rotation degree of the motor is in the irregular range (for example, the maximum rotation degree of the motor 6 (28,800 degrees for 80 rotations) or more), a relay-off signal is output from the CPU 10 to the relay drive circuit 12 in step S12 to cut off power supply. In step S13, the clutch 7 is turned off not to transmit the torque of the motor 6 to the steering shaft. Thereafter, in step S14, a motor application voltage of 0 V is output to the motor drive circuit 14 to stop the drive of the motor 6. The steps S1 to S14 are performed repeatedly.

The rotation degree of the motor obtained in the step S7 may be cleared to 0 each time the rotation direction of the motor changes.

According to this process, when the clutch 7 is faulty (off), for example, one terminal of the motor 6 is short-circuited with the motor power source, and if the relay 13 is turned on under the condition that the other terminal of the motor 6 is grounded, the motor 6 rotates by itself. However, since the rotation degree of the motor is calculated in the step S7, when the motor 6 makes over 80 rotations, a fault in the motor is detected in the step S8, and the relay 13 and the clutch 7 are turned off to stop the drive of the motor in the steps S12 to S14. Therefore, a system fault can be handled properly, thus improving the reliability of handling.

In addition, faults in the sensor for detecting the rotation speed of the motor (tachogenerator, for example) and the motor rotation speed detection circuit 17 can be detected.

Embodiment 2

Figure 3:
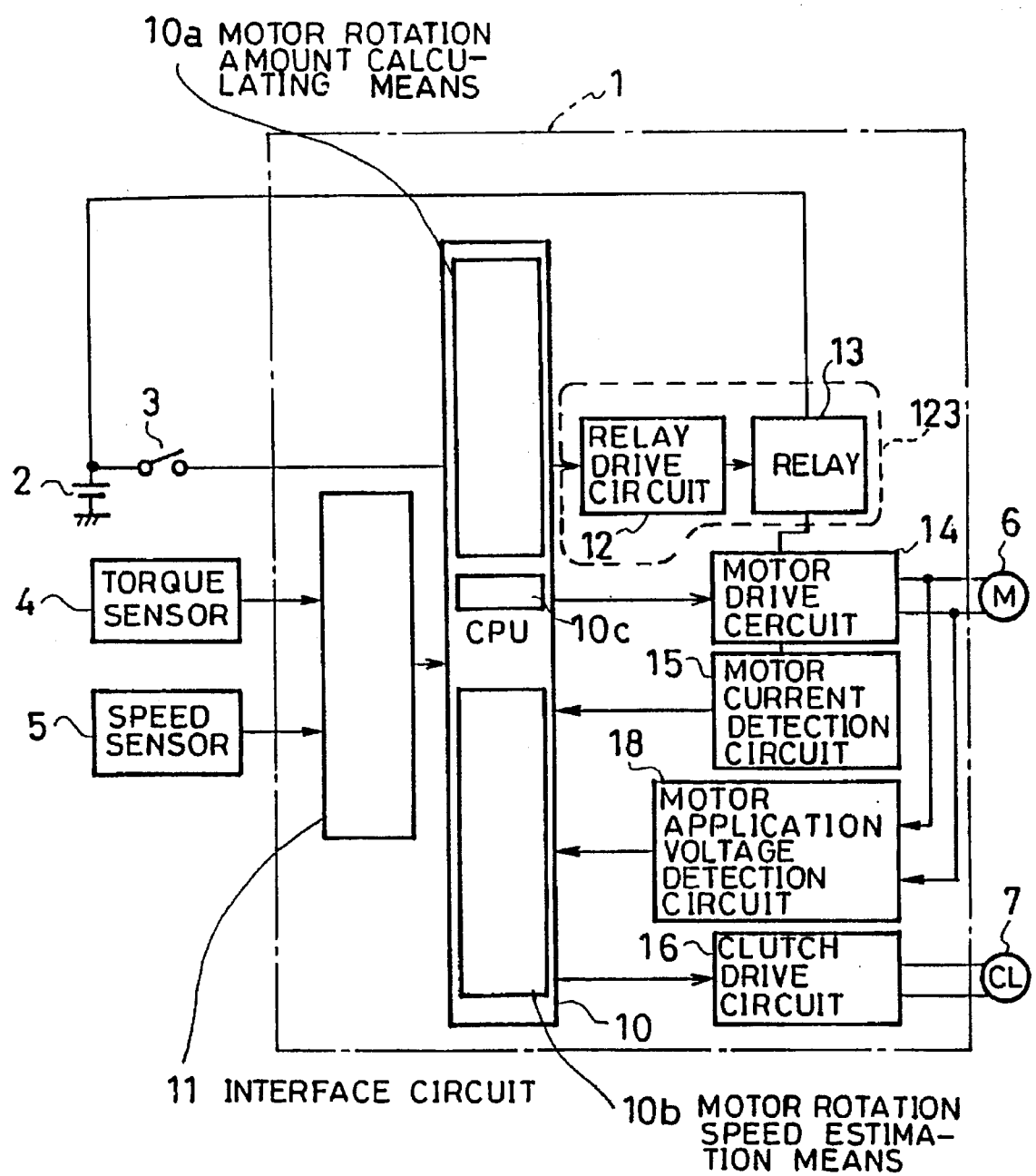
FIG. 3 is a block diagram of the substantial configuration of an electric power steering controller as a motor controller according to Embodiment 2 of the invention.

FIG. 3 is a block diagram of the substantial configuration of an electric power steering controller as a motor controller according to Embodiment 2 of the invention. In FIG. 3, the same or corresponding elements as those of FIG. 1 are given the same reference codes and their descriptions are omitted.

In FIG. 3, reference numeral 18 represents a motor application voltage detection circuit for detecting a voltage between the motor terminals to detect a motor application voltage applied to the motor, and is formed of an unshown operational amplifier, for example. Rotation speed estimation means 10b within the CPU 10 estimates the rotation speed of the motor 6 based on a motor current detected by the motor current detection circuit 15 (motor current detection means) and a motor application voltage applied to the motor 6 by the motor drive circuit 14 (motor drive means). Motor application voltage determination means 10c within the CPU 10 determines a voltage to be applied to the motor 6.

Figure 4:
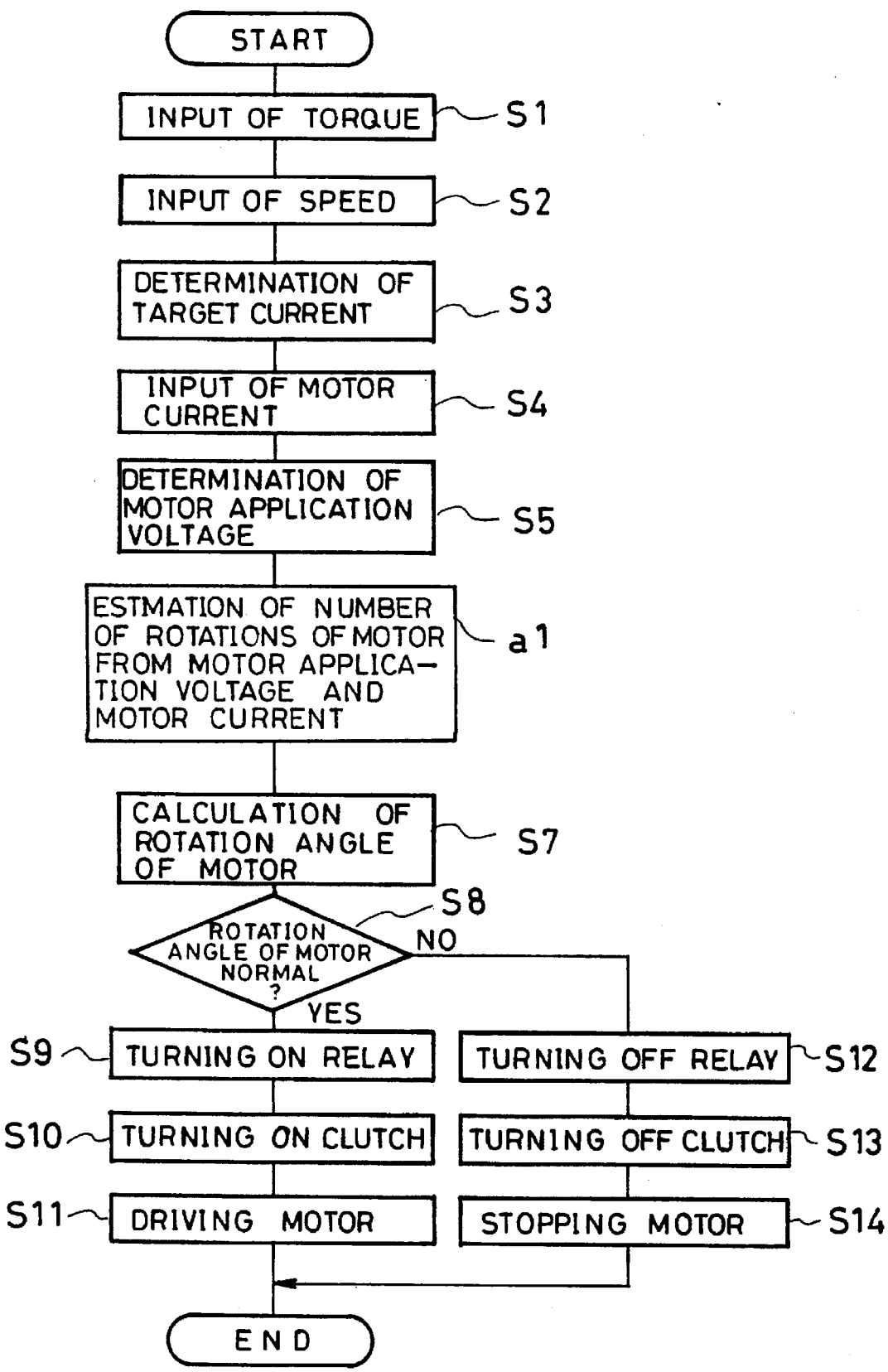
FIG. 4 is a flow chart explaining the operation of Embodiment 2.

A description is subsequently given of the operation of Embodiment 2 with reference to the flow chart of FIG. 4. In FIG. 4, elements having the same reference codes as in FIG. 2 operate in the same manner and their descriptions are omitted. In FIG. 4, the rotation speed of the motor 4 is estimated from a motor application voltage applied to the motor 6 and a current running through the motor 6 (step a1). An estimated value of the rotation speed of the motor has a positive or negative polarity according to the rotation direction of the motor 6. Since the electric power steering system controls in such a way that a current running through the motor 6 becomes equal to a target current determined in the step S3, the motor application voltage determined in the step S5 becomes equal to a voltage applied to the motor 6.

According to this process, in an electric power steering controller which comprises the motor current detection circuit having the motor current detection resistor 35 on the current flow-out side of the bridge circuit 34 like the motor drive circuit 14 shown in FIG. 1, the rotation speed of the motor is estimated to be fast because a motor current smaller than a motor application voltage is detected when a motor terminal is grounded. For this reason, the rotation degree of the motor calculated in the step S7 exceeds the maximum rotation degree of the motor 6 and it is determined that a fault occurs in the motor in the step S8. As a result, the relay 13 and the clutch 7 are turned off to stop the drive of the motor 6 in the steps S12 to 14. This is the same when the motor current detection resistor 35 is provided on the current flow-in side of the bridge circuit 34. Moreover, this process does not require the motor application voltage detection circuit 18. In addition, the drive of the motor can be stopped when the motor terminal is short-circuited or a motor cable is disconnected. For instance, when the motor cable is disconnected, if the output of a motor drive instruction from the CPU 10 is not stopped, there is the danger that the motor 6 is driven abruptly when the disconnected motor cable is grounded by vibration or other causes. However, if the output of a motor drive instruction from the CPU 10 is stopped when the motor cable is disconnected, the motor 6 is not driven abruptly even when the disconnected motor cable is grounded by vibration or other causes, whereby safety is improved.

As described above, since Embodiment 2 of the invention eliminates the need for the motor application voltage detection means and comprises motor application voltage determination means 10c within the CPU 10, sensors other than the torque sensor 4 and the speed sensor 5 need not be added, and the number of wires between the sensors and the control unit 1 and wiring operation does not increase, whereby costs are reduced.

Embodiment 3

Figure 5:
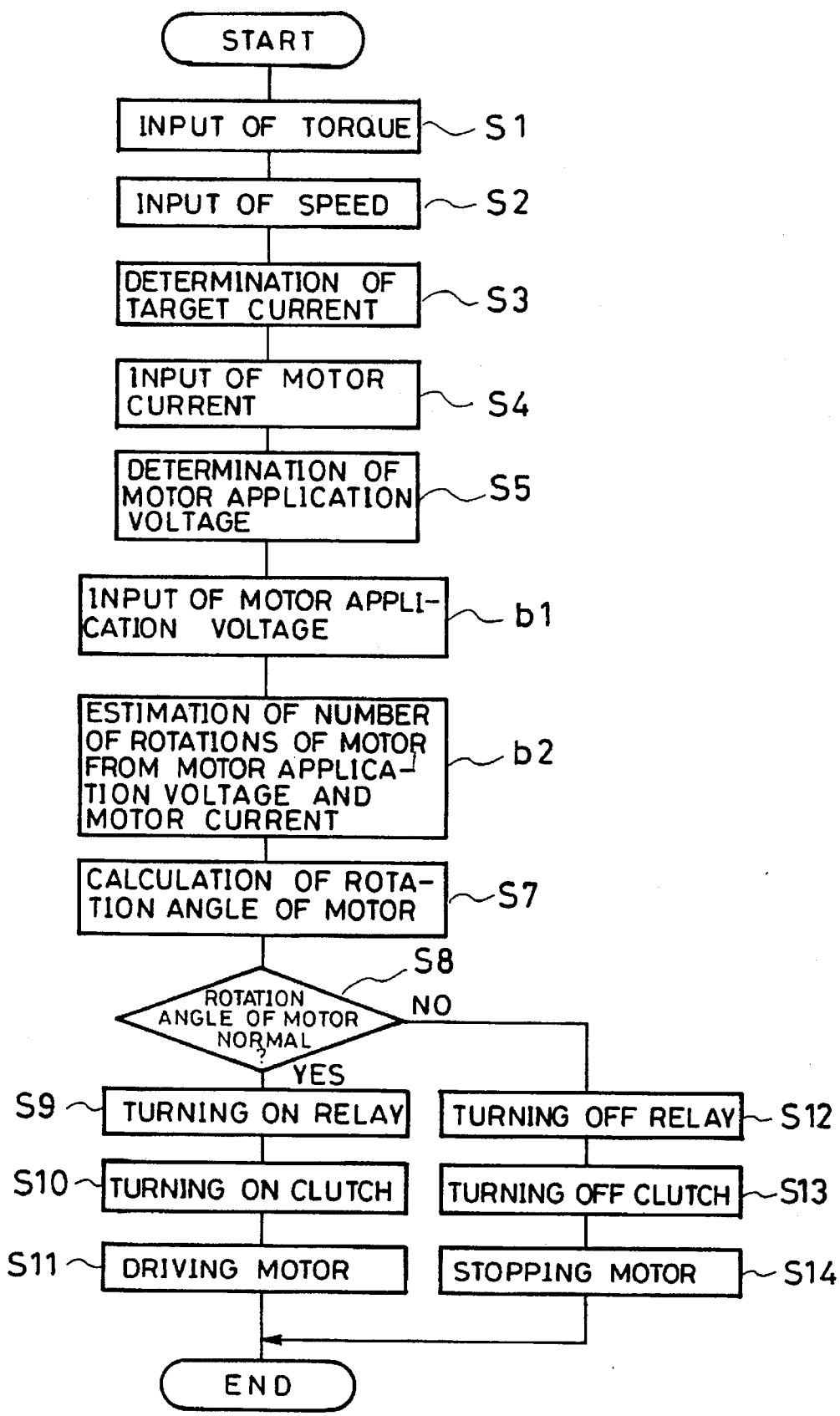
FIG. 5 is a flow chart explaining the operation of an electric power steering controller as a motor controller according to Embodiment 3 of the invention.

FIG. 5 is a flow chart showing the operation of an electric power steering controller as a motor controller according to Embodiment 3 of the invention. The configuration of the electric power steering controller of this Embodiment 3 is the same as shown in FIG. 3. In FIG. 5, the same reference codes indicate the same steps as in FIG. 2 and their descriptions are omitted. In FIG. 5, a motor application voltage detected by the motor application voltage detection circuit 18 shown in FIG. 3 is input (step b1) and there is provided the step b2 of estimating the rotation speed of the motor from the motor application voltage applied to the motor 6 and input in the step b1 and a current running through the motor 6. The process shown in FIG. 5 repeats the steps S1 to S14 as well. The rotation speed of the motor is estimated from the relationship among a motor application voltage, a motor current and the rotation speed of the motor.

According to this process, in an electric power steering controller which comprises the motor current detection circuit 15 having the motor current detection resistor 35 on the current flow-out side of the bridge circuit 34 like the motor drive circuit 14 shown in FIG. 3, the rotation speed of the motor is estimated to be fast because a motor current smaller than a motor application voltage is detected when a motor terminal is grounded. For this reason, the rotation degree of the motor calculated in the step S7 exceeds the maximum rotation degree of the motor 6, it is determined that a fault occurs in the step S8, and the relay 13 and the clutch 7 are turned off to stop the drive of the motor 6 in the steps 12 to 14. The same process is performed when the unshown motor current detection resistor 35 is provided on the current flow-in side of the bridge circuit 34.

As described above, according to Embodiment 3 of the invention, a motor application voltage detected by the motor application voltage detection circuit 18 is used to calculate the amount of motor rotation so that control with regard to whether or not drive power is supplied to the motor 6 is performed. A motor application voltage applied to the motor 6 is detected by the motor application voltage detection circuit 18 and the detected voltage is used to calculate the rotation degree of the motor, thus improving the detection accuracy of the rotation degree of the motor.

Embodiment 4

Figure 6:
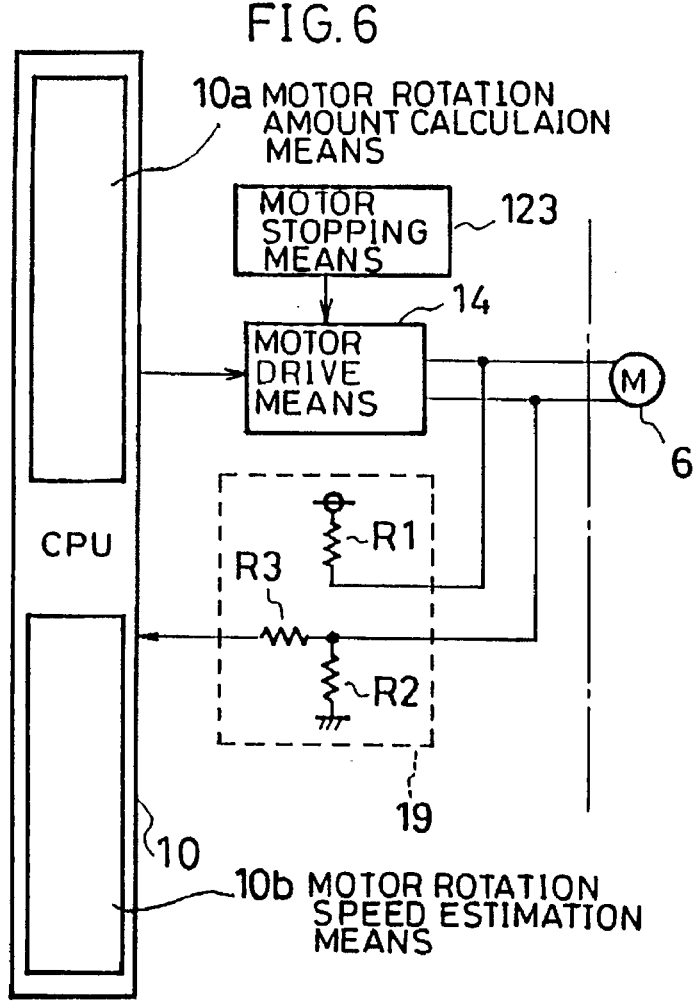
FIG. 6 is a block diagram of the substantial configuration of a motor terminal voltage detection circuit and other elements provided in an electric power steering controller as a motor controller according to Embodiment 4 of the invention.
Figure 7:
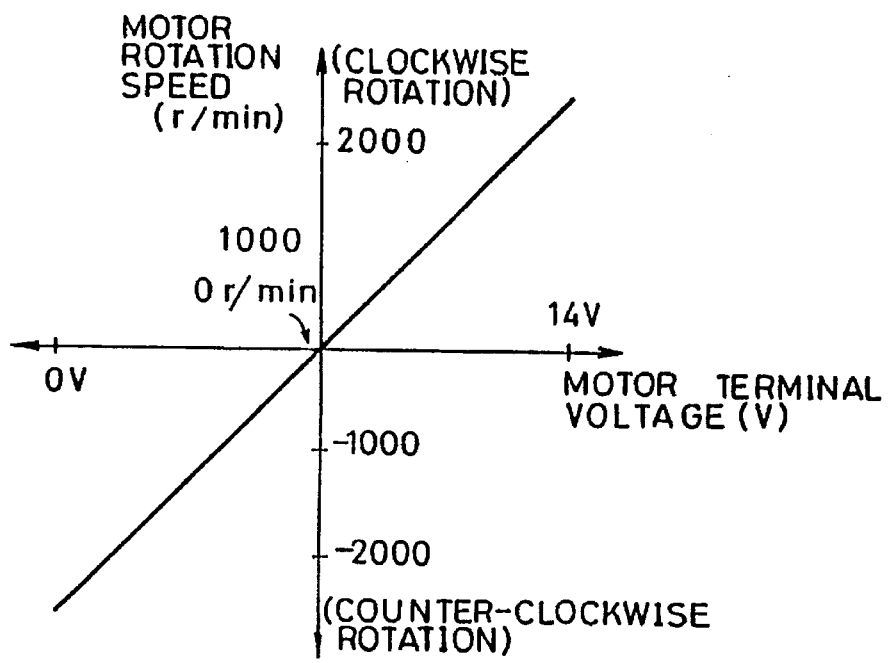
FIG. 7 is a diagram of the characteristic showing the relationship between a motor terminal voltage and the number of rotations of the motor in Embodiment 4.

FIG. 6 is a block diagram of a motor terminal voltage detection circuit and other elements provided in an electric power steering controller as a motor controller according to Embodiment 4 of the invention. The entire configuration of the controller is shown in FIG. 1 or FIG. 3. As shown in FIG. 6, one terminal of the motor 6 is connected to a power source by a resistor R1 and the other terminal is grounded by a resistor R2 so that a voltage obtained by dividing power by the resistors R1 and R2 is biased to the motor 6. The resistors R1 and R2 are used as motor bias means. Reference numeral 19 represents a motor terminal voltage detection circuit for detecting the biased motor terminal voltage of the motor 6. One end of the resistor R3 is connected to one end of the resistor R2 and the other end is connected to the CPU 10. When a motor terminal voltage is detected by the motor terminal voltage detection circuit 19, a bias voltage is changed by the power generation voltage of the motor 6 if the motor 6 is rotated by external force when the motor is not driven. The relationship between a motor terminal voltage detected by the motor terminal voltage detection circuit 19 and the rotation speed of the motor is such as shown in FIG. 7. In other words, a motor terminal voltage is changed toward a positive or negative direction with respect to a voltage biased by the resistors R1 and R2 according to the number of rotations of the motor. According to this characteristic, the rotation speed of the motor can be estimated when the motor is not driven. Also, it is determined that the rotation speed of the motor is the maximum because a motor terminal voltage is 0 V or a power voltage when a motor terminal is grounded or short-circuited. The term "external force" used herein refers to a self-aligning torque in an electric power steering controller, for example. When a driver releases his or her hands after he or she turns the steering wheel while driving, front wheels return to a straight forward position due to the self-aligning torque. The steering wheel rotates by itself during this and the motor 6 is rotated. Since the steering wheel is released, a detection torque detected by the torque sensor 4 becomes zero and the motor 6 becomes undriven. When the steering wheel is turned back, the steering torque becomes zero in a moment and the motor becomes undriven. At this time, the motor 6 is rotated by the driver's turning the steering wheel.

The characteristic shown in FIG. 7 indicates the relationship between the rotation speed of the motor and a motor terminal voltage. The CPU 10 may have the characteristic shown in FIG. 7 as a map. Calculation may be made on a motor terminal voltage based on the characteristic shown in FIG. 7 to obtain the number of rotations of the motor.

Figure 8:
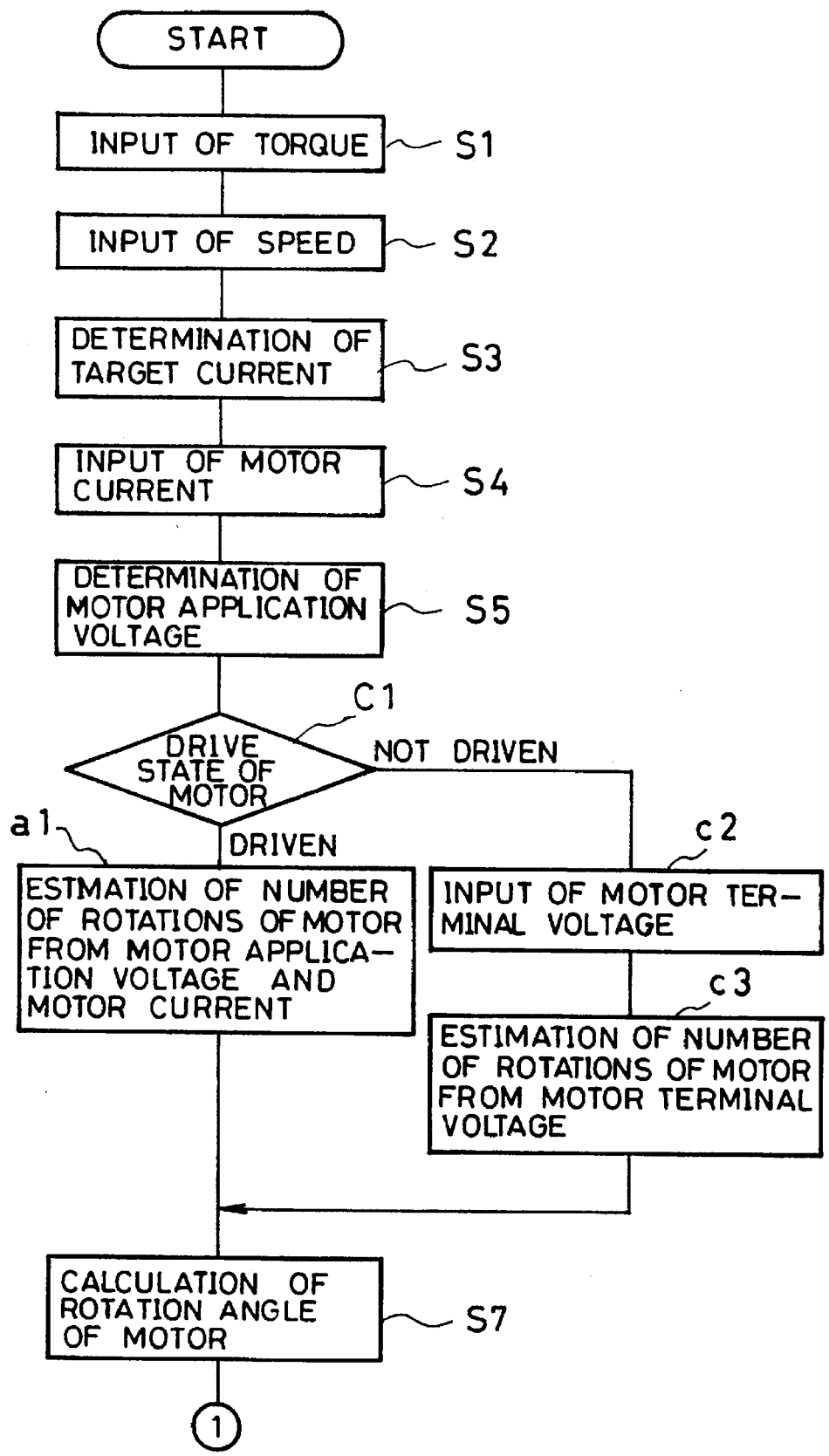
FIG. 8 is a flow chart explaining the operation of Embodiment 4.

A description is subsequently given of the operation of Embodiment 4 of the invention with reference to a flow chart of FIG. 8. In FIG. 8, the same reference codes indicate the same steps as in FIG. 4 and their descriptions are omitted. In FIG. 8, the process for estimating the rotation speed of the motor 6 differs by the drive state of the motor (step c1). For instance, when a voltage applied to the motor 6 is 0 V in the previous steps S1 to S14, it is determined that the motor is not driven and a motor terminal voltage detected by the motor terminal voltage detection circuit 19 is input in step c2 to obtain the rotation speed of the motor based on the characteristic shown in FIG. 7 (step c3). When a voltage applied to the motor 6 is not 0 V in the previous steps S1 to S14, it is determined that the motor is driven and the rotation speed of the motor is estimated in step a1.

According to this process, since an abnormal amount of motor rotation can be monitored when the motor is not driven, the reliability of this embodiment is higher than that of Embodiment 2. In addition, it is possible to estimate the rotation speed of the motor with a circuit simpler than the motor application voltage detection circuit 18 for detecting a motor application voltage used in Embodiment 3.

The motor application voltage detection circuit of Embodiment 3 needs to use a linear IC such as an operational amplifier to detect the potential difference (voltage) between motor terminals, but the motor terminal voltage detection circuit 19 of Embodiment 4 shown in FIG. 6 can be constituted by resistors only.

Embodiment 5

Figure 9:
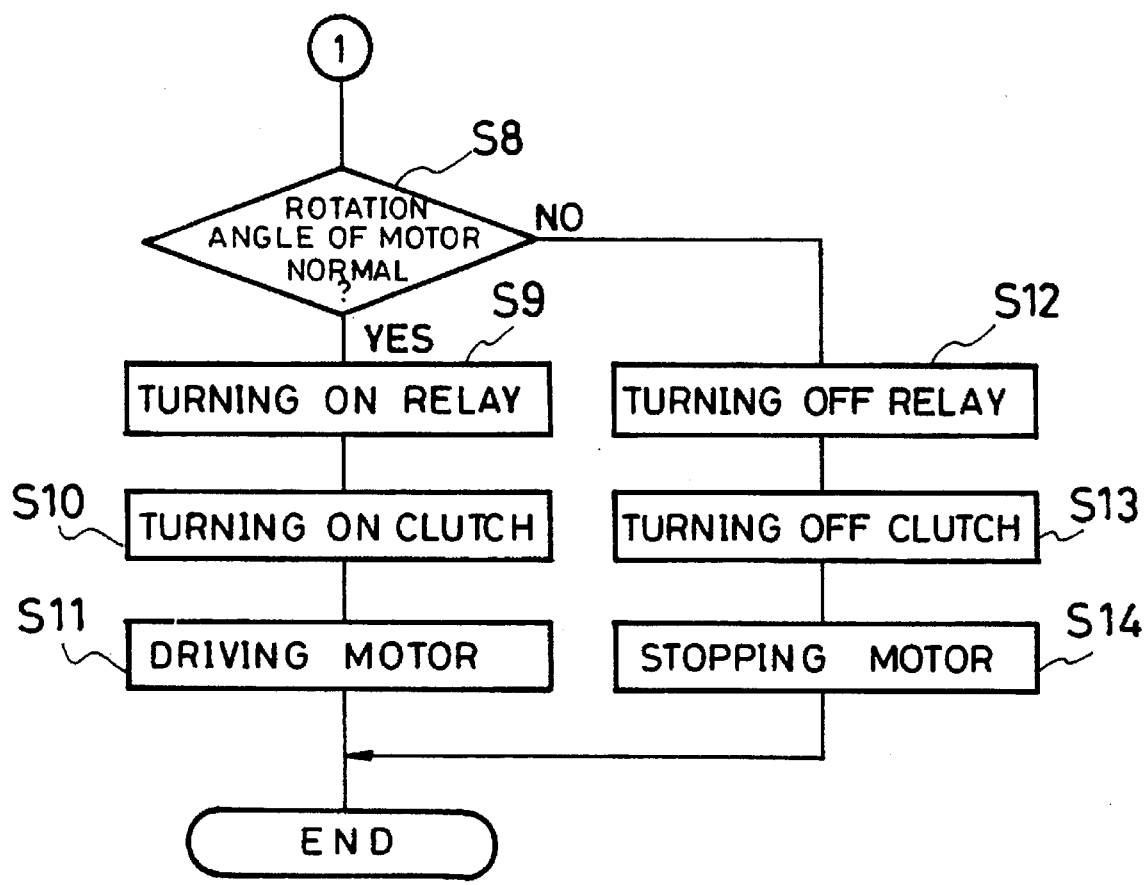
FIG. 9 is a flow chart explaining the operation of Embodiment 4.
Figure 10:
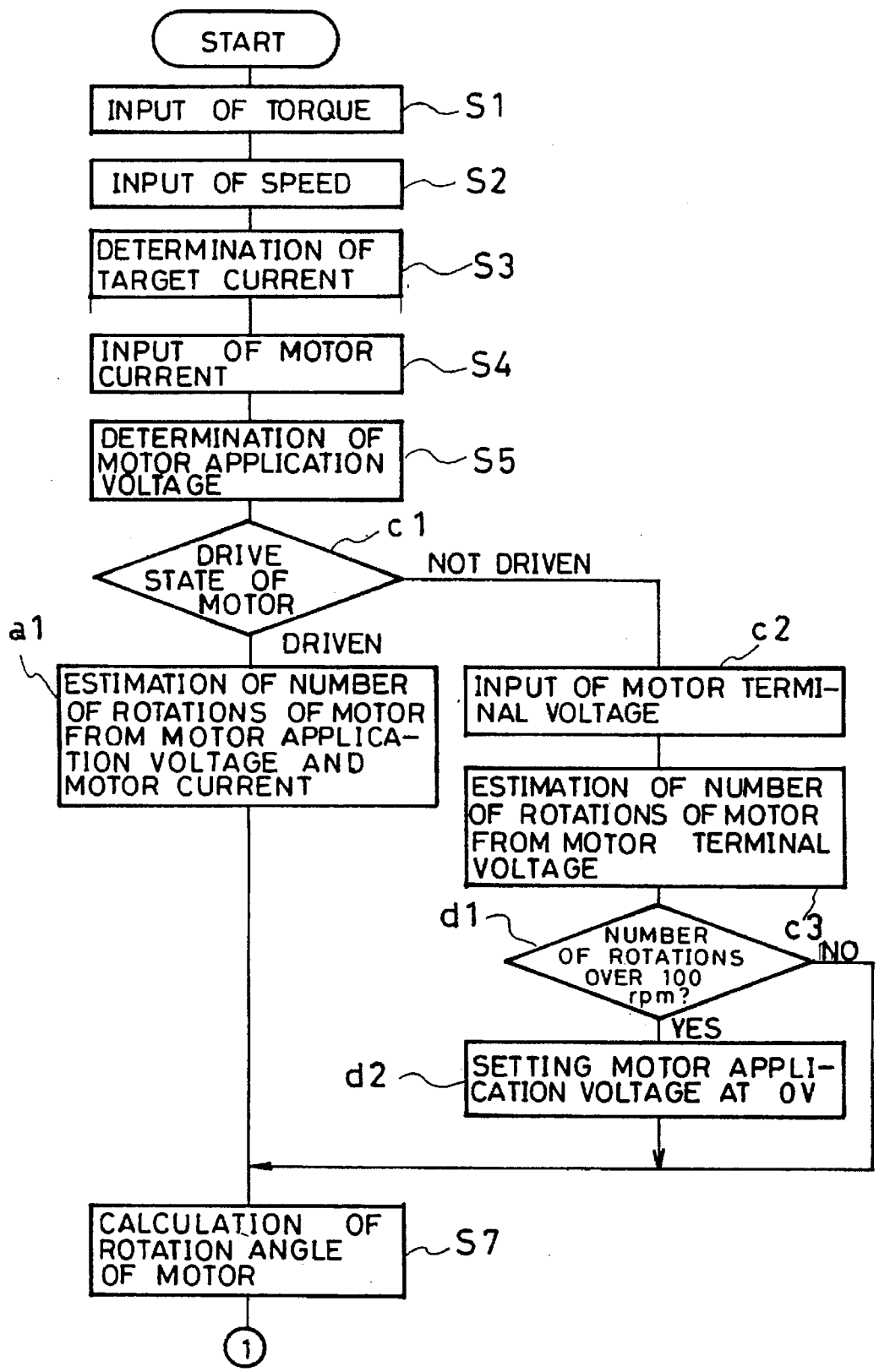
FIG. 10 is a flow chart explaining the operation of an electric power steering controller as a motor controller according to Embodiment 5 of the invention.
Figure 11:
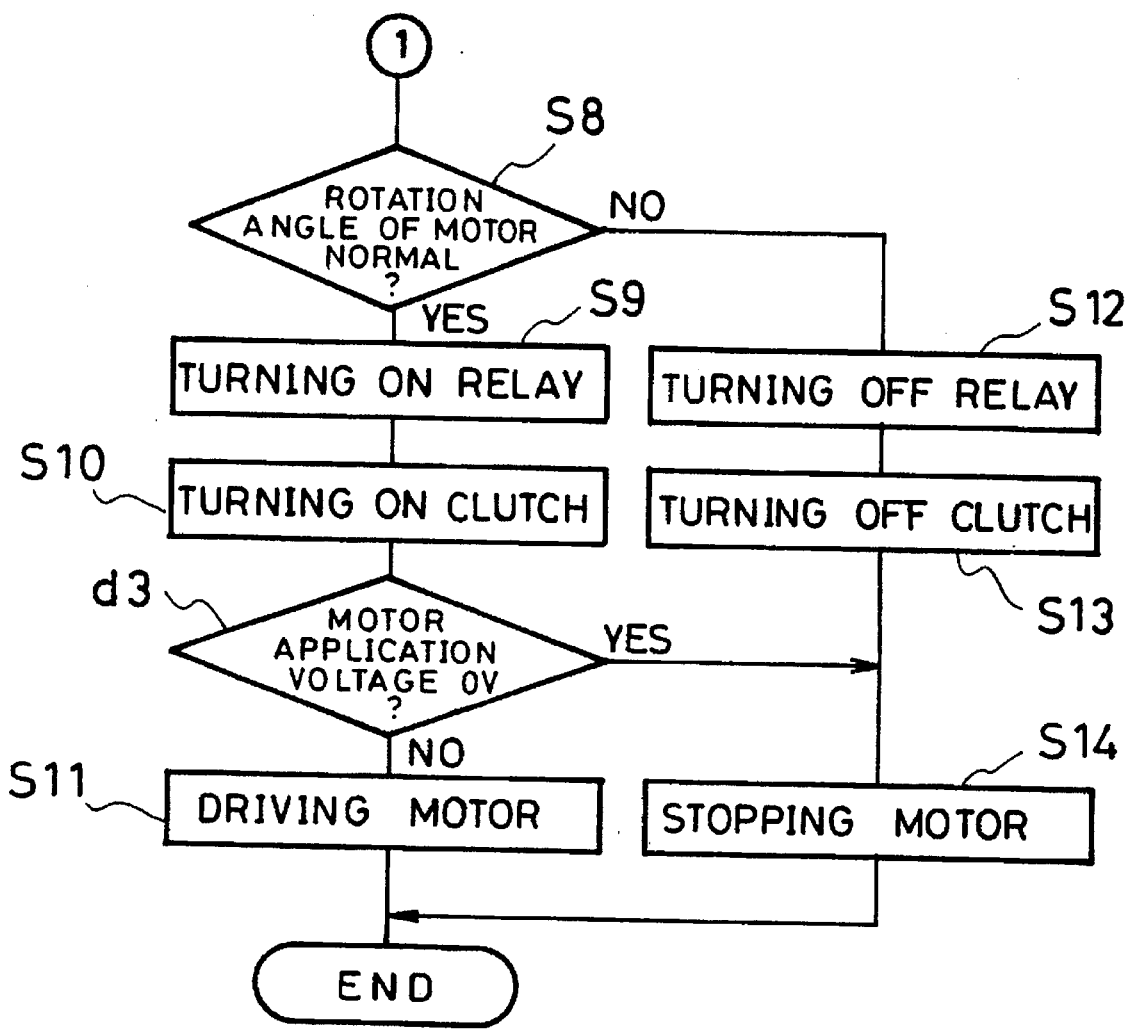
FIG. 11 is a flow chart explaining the operation of an electric power steering controller as a motor controller according to Embodiment 5.

FIGS. 10 and 11 are flow charts showing the operation of an electric power steering controller as a motor controller according to Embodiment 5 of the invention. The entire configuration of the controller is shown in FIG. 1 or FIG. 3. In FIGS. 10 and 11, the same reference codes indicate the same steps as in FIGS. 8 and 9 and their descriptions are omitted. In FIGS. 10 and 11, it is determined whether or not the rotation speed of the motor obtained in the step c3 exceeds a predetermined value (100 rpm, for example) when the motor is not driven (step d1). If the rotation speed exceeds 100 rpm, a motor application voltage determined in the step S5 is set at 0 V (step d2). Thereafter, it is determined whether or not a motor application voltage is 0 V in step d3, and if the voltage is 0 V, the drive of the motor 6 is stopped by the motor stopping means in step S14. On the other hand, if the voltage is not 0 V, the motor 6 is driven in step S11. When the motor is not driven by stopping power supply, the rotation speed of the motor decreases along an elapse of time and, hence, an estimated value of the rotation speed of the motor decreases. However, when a motor terminal or the like is grounded, it is detected from a motor terminal voltage input in the step c2 that the rotation speed of the motor estimated in the step c3 is fast. Then, when the rotation speed of the motor is above a predetermined value, safety is ensured by stopping the drive of the motor until the rotation speed of the motor decreases when a motor terminal or the like is grounded. In this instance, since the number of rotations of the motor when the motor is not driven is obtained from a motor terminal voltage, a constant number of rotations of the motor is detected according to contact resistance when a motor terminal or the like is grounded having contact resistance. Therefore, the above-described predetermined value indicates the degree of grounding the motor terminal (level of contact resistance), for example, the number of rotations of the motor detected when the grounding has contact resistance of such a level that the motor drive circuit 14 or the like is broken.

Since, the rotation degree of the motor is always calculated in step S7 when the motor terminal or the like is grounded, the rotation degree of the motor calculated in the step S7 exceeds the maximum rotation degree of the motor. It is determined that a fault occurs in step S8 and the relay 13 and the clutch 7 are turned off to stop the drive of the motor 6 in the steps S12 to 14. With this process, a secondary fault that the elements of the motor drive circuit 14 are broken by grounding the motor cable or the like can be prevented.

The above-described predetermined value of 100 rpm is determined as follows. That is, the speed at which the motor is rotated by external force (such as self-aligning torque) and a time during which the motor is rotated in an electric power steering controller are checked on an actual vehicle, a fault is not erroneously detected when a motor cable is in order, and the maximum value at which a fault is detected is obtained when the motor cable is grounded.

Figure 12A:
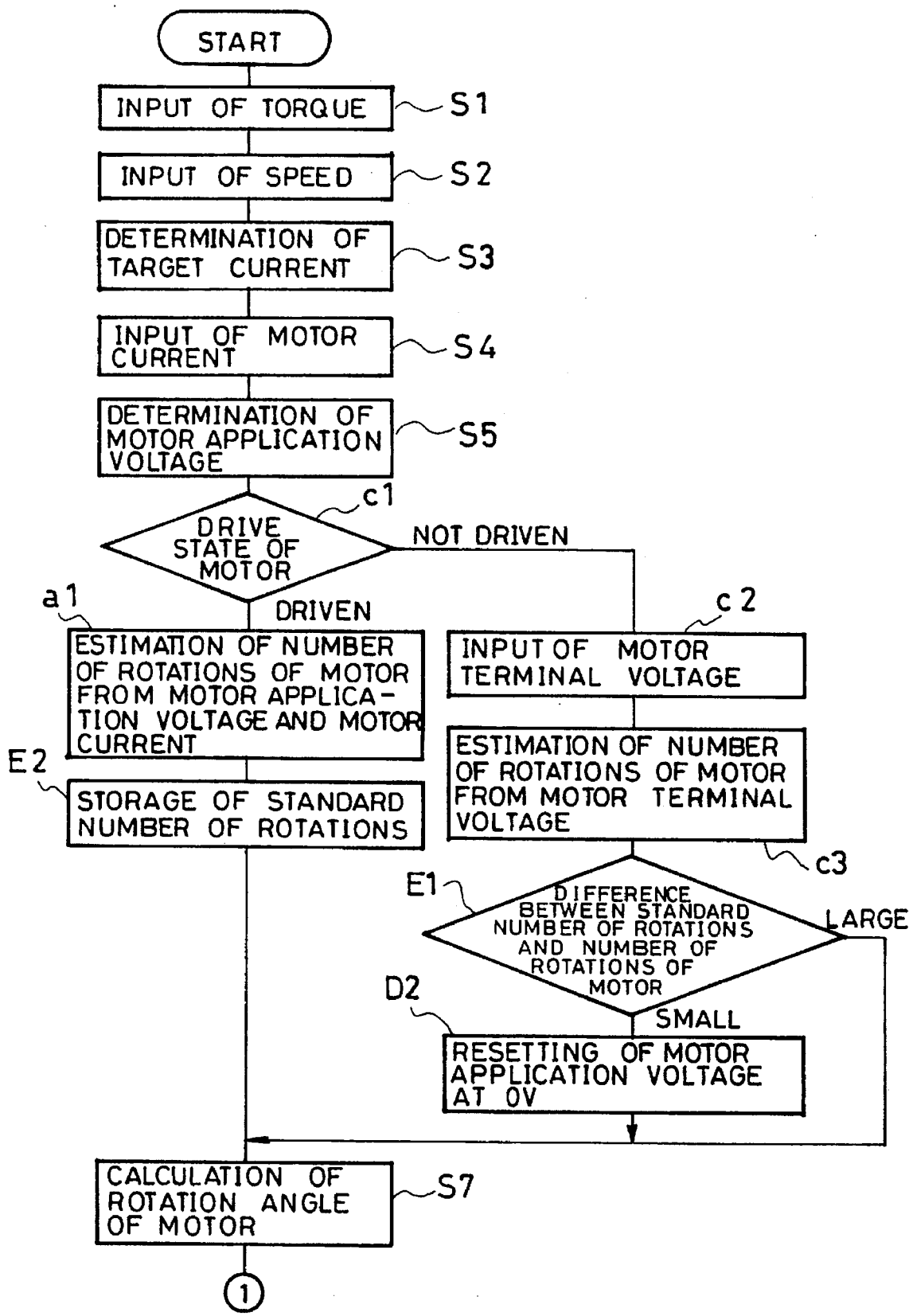
FIG. 12(a) is another flow chart of Embodiment 5.
Figure 12B:
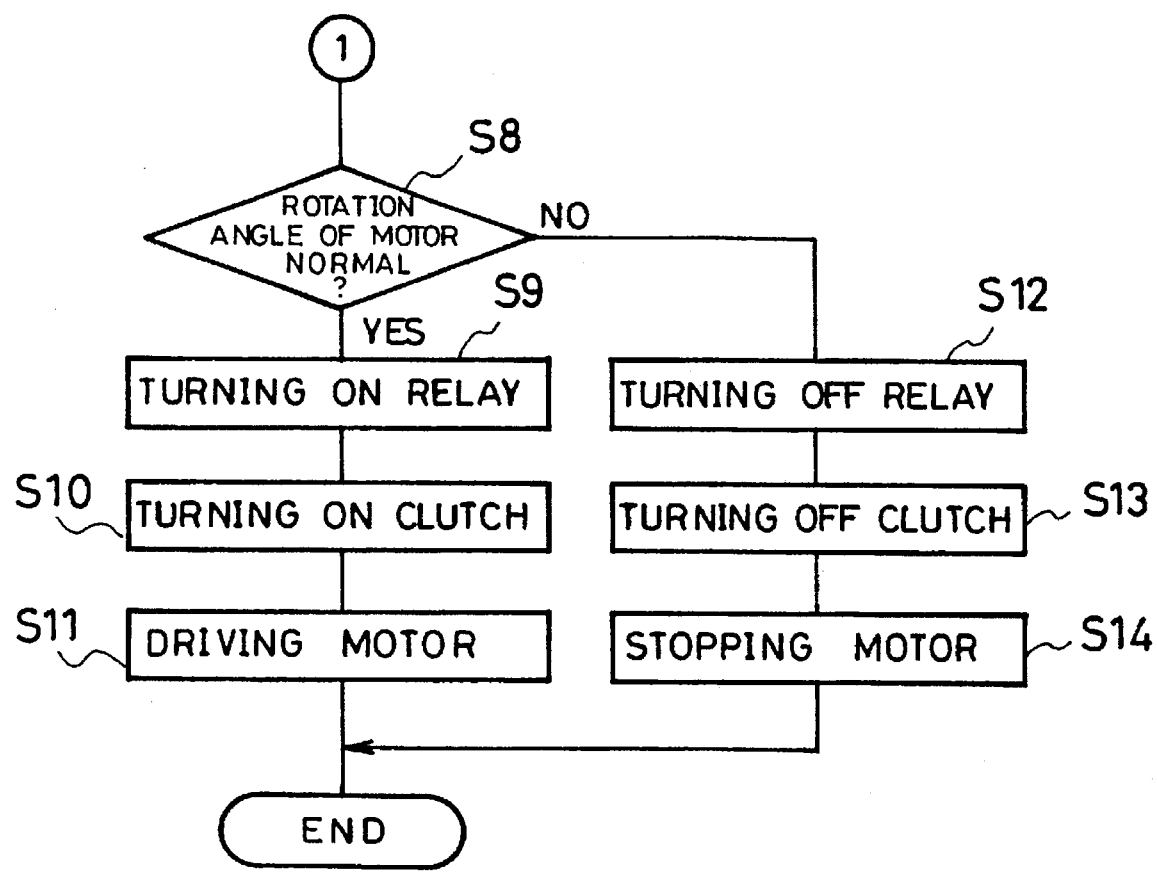
FIG. 12(b) is another flow chart of Embodiment 5.

The step d1 shown in FIG. 10 may be used to determine whether the rotation speed of the motor is reduced or not. In this case, the step is changed to step E1 shown in the flow chart of FIG. 12(a) or step S8 shown in the flow chart of FIG. 12(b) in which power supply to the motor is stopped when the difference between the number of rotations when the motor is driven and the number of rotations when the motor is not driven is not more than a predetermined value. Since the drive of the motor is thereby stopped until the number of rotations of the motor when the motor is not driven becomes smaller than the number of rotations when the motor is driven by a predetermined value, a fault is detected from the rotation degree of the motor obtained from the number of rotations of the motor when motor terminals are out of order, and the drive of the motor, the output of the clutch and the output of the relay are stopped. Further, since it is only necessary to reduce the number of rotations of the motor by the predetermined value when motor terminals are in order, a time during which the drive of the motor is stopped becomes short and the motor can be redriven quickly. Also, for example, when the number of rotations of the motor when the motor is not driven is not smaller than the number of rotations of the motor when the motor is driven by a detection error in the number of rotations, the drive of the motor is stopped.

Embodiment 6

Figure 13:
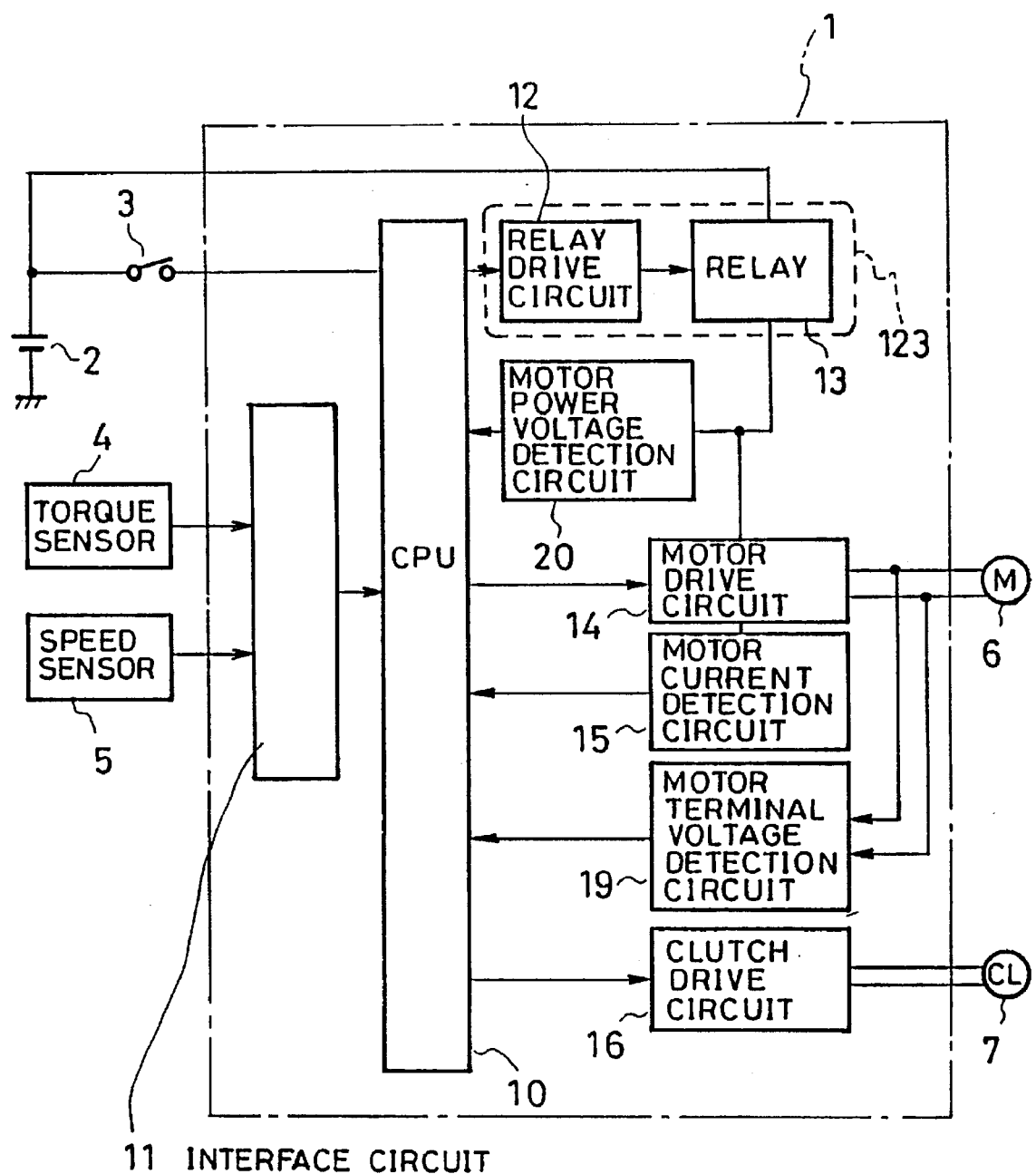
FIG. 13 is a block diagram of the substantial configuration of an electric power steering controller as a motor controller according to Embodiment 6 of the invention.

FIG. 13 is a block diagram of the substantial configuration of an electric power steering controller as a motor controller according to Embodiment 6 of the invention. In FIG. 13, the same or corresponding elements as in FIGS. 1, 3 and 6 are given the same reference codes and their descriptions are omitted. In FIG. 13, reference numeral 20 represents a motor power voltage detection circuit for detecting a motor power voltage to be supplied to the motor drive circuit.

Figure 14:
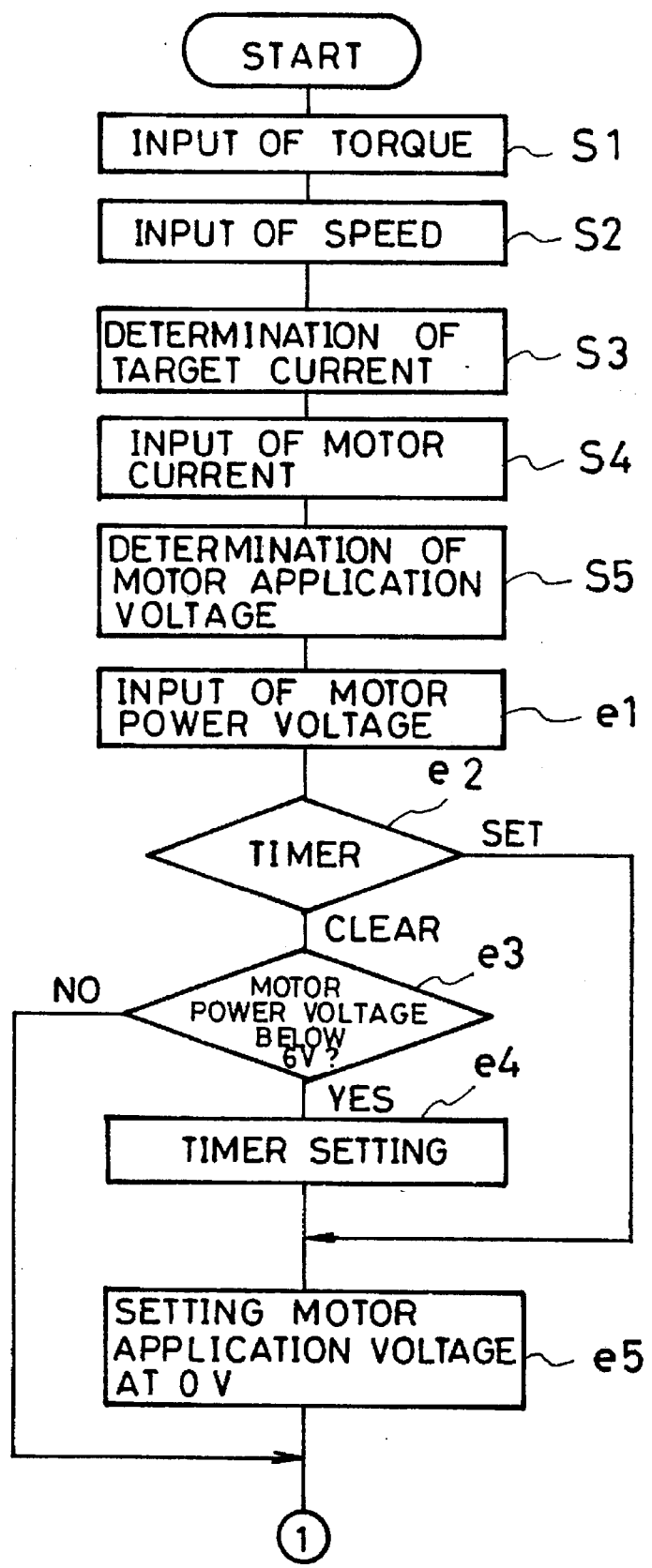
FIG. 14 is a flow chart explaining the operation of Embodiment 6.
Figure 15:
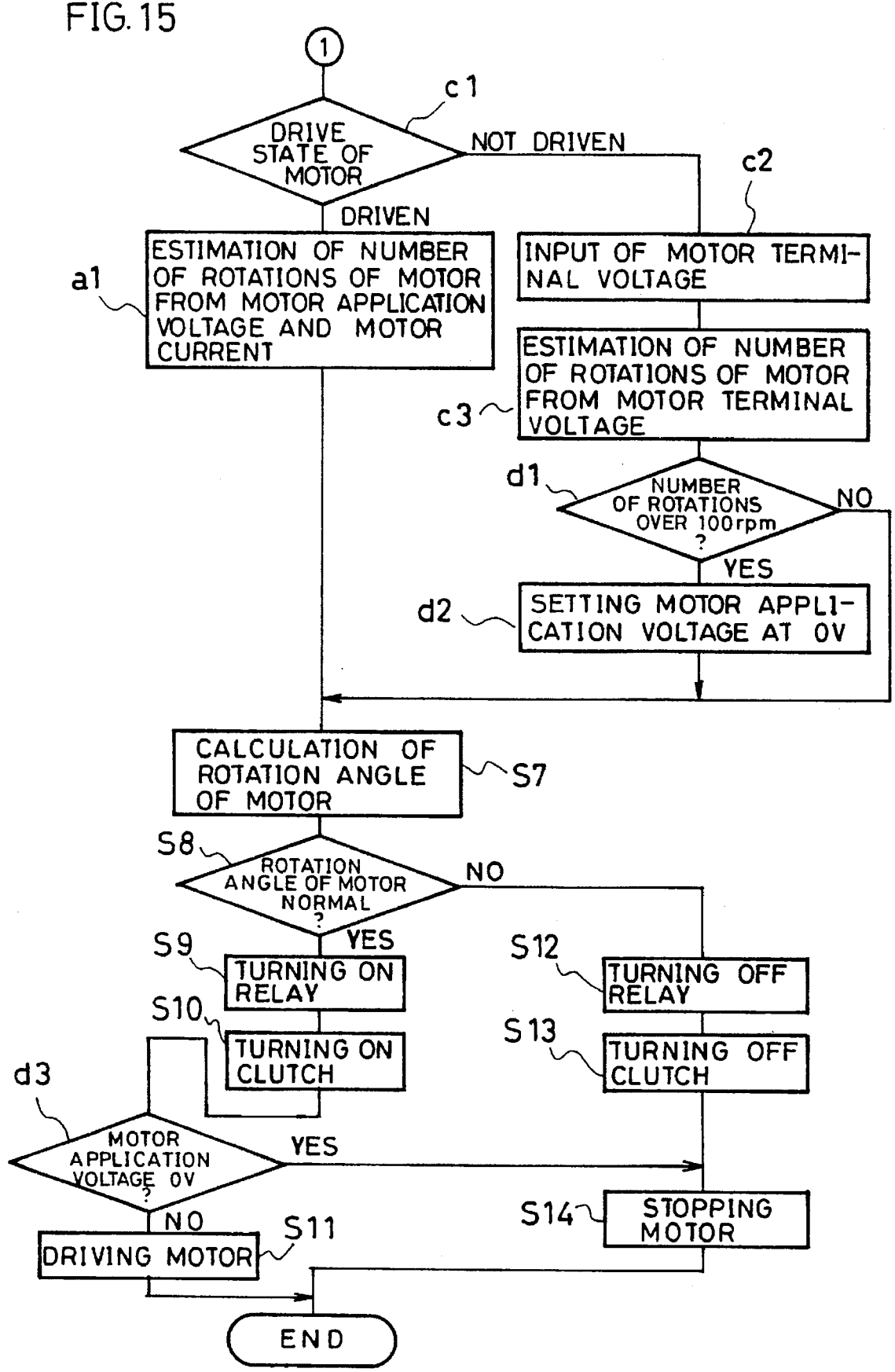
FIG. 15 is a flow chart explaining the operation of Embodiment 6.

A description is subsequently given of the operation of Embodiment 6 of the invention with reference to flow charts of FIGS. 14 and 15. In FIG. 14, the same steps as in FIGS. 10 and 11 are given the same reference codes and their descriptions are omitted. In FIGS. 14 and 15, after a motor application voltage is determined in the step S5, the motor power voltage is input through the motor power voltage detection circuit 20 (step e1) and it is determined whether a timer to be described later is set or not (step e2). When the timer is cleared, it is determined whether the motor power voltage input in the step e1 falls below a predetermined value, for example, a value (6 V) at which a battery voltage drops at the time of cranking (step e3). The term "cranking" used above refers to the rotation of an output shaft for starting an engine using a starter or the like. Since a large current runs through the starter while the starter is rotated, a battery voltage drops. After the step e3, if a motor power voltage falls below 6 V, the timer is set (step e4). The set timer continues to count down until it is cleared to "0" in the step e2 each time the steps S1 to 14 are repeated. The timer is set when the motor power voltage is below 6 V (step e4). The motor application voltage determined in the step S5 is set at 0 V (step e5). The step e5 is continued while it is found by the decision of the step e2 that a value is set in the timer. If the motor power voltage is larger than 6 V in the step e3, it is determined whether the motor is driven or not (step c1).

In this process, if the motor power voltage drops due to the grounded motor terminal when the motor 6 is driven, for example, the drive of the motor 6 is stopped during a time set by the timer. The rotation speed of the motor is estimated from a motor terminal voltage detected by the motor terminal voltage detection circuit 19 when the drive of the motor is stopped, it is determined by the process of Embodiment 4 or 5 that a fault occurs in the motor, and the drive of the motor is stopped. When the motor 6 is in order, it returns to normal operation after an elapse of a predetermined time to resume control. Further, since a power voltage returns to a normal level by stopping the drive of the motor, it is possible to prevent the CPU 10 from being reset by a fall in power voltage. Also, with this process, it is possible to prevent a secondary fault that the elements of the motor drive circuit 14 are broken by grounding a motor cable or the like.

When a power voltage of the motor 6 falls below a predetermined value, the following effects can be obtained by stopping power supply to the motor 6. That is, since an excess current flows through a motor terminal when the motor terminal is grounded, a battery voltage may drop. At this time, when the drive of the motor is stopped, an excess current does not flow through the motor terminal and a battery voltage returns to a normal level. If the number of rotations of the motor obtained from a motor terminal voltage exceeds a predetermined value when the drive of the motor is stopped, the drive of the motor is continued to be stopped. When the rotation degree of the motor exceeds a level at which a fault is determined, the drive of the motor, the relay circuit and the clutch is stopped. In this way, the grounding of the motor can be detected from a reduction in the power voltage of the motor.

The CPU 10 is reset when a battery voltage drops to a level that requires the CPU 10 to be reset. For instance, when the CPU 10 is reset due to a reduction in battery voltage caused by the grounding of the motor terminal or the like, the relay circuit is turned off by resetting the CPU 10 and a battery voltage returns to a normal level. When the battery voltage returns to a normal level, the CPU 10 is reset and the relay circuit is turned on. However, at the same time when the relay circuit is turned on, a battery voltage drops by the grounding of the motor cable or the like with the result that the CPU 10 is reset. In this way, there is an inconvenience of generating relay hunting by a repetition of resetting the CPU 10 and turning on the relay.

Embodiment 7

Figure 16:
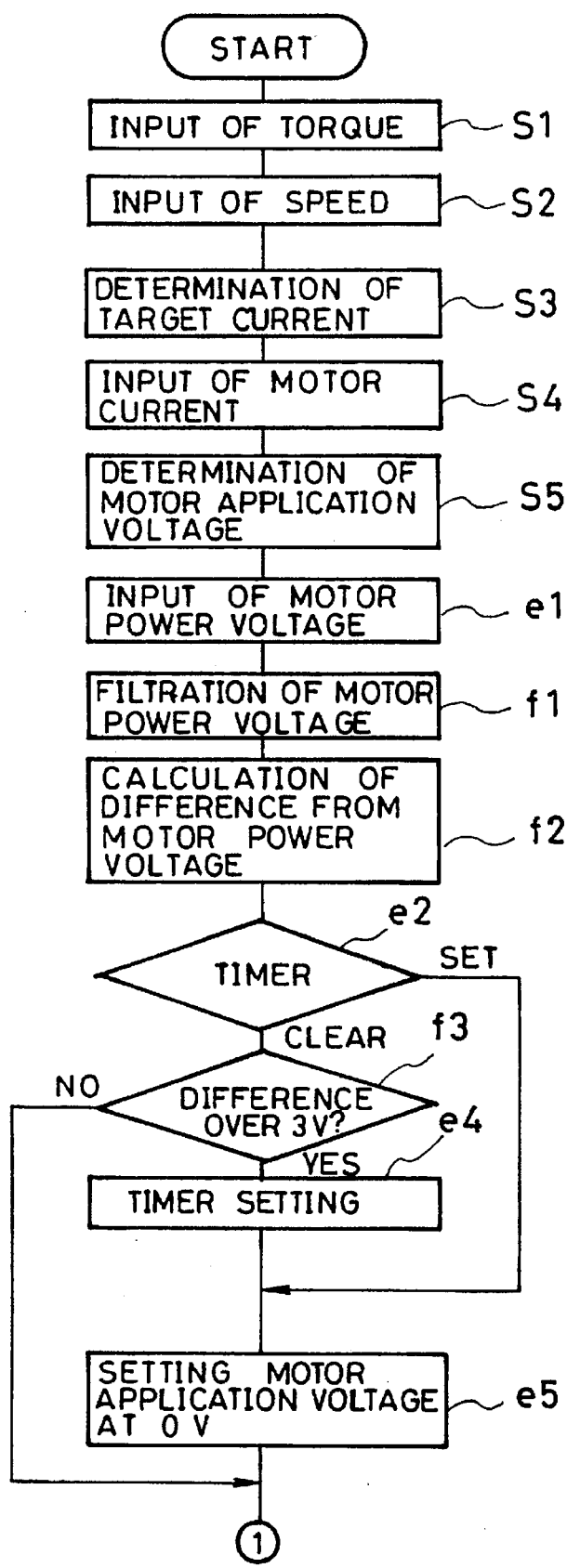
FIG. 16 is a flow chart explaining the operation of an electric power steering controller as a motor controller according to Embodiment 7 of the invention.
Figure 17:
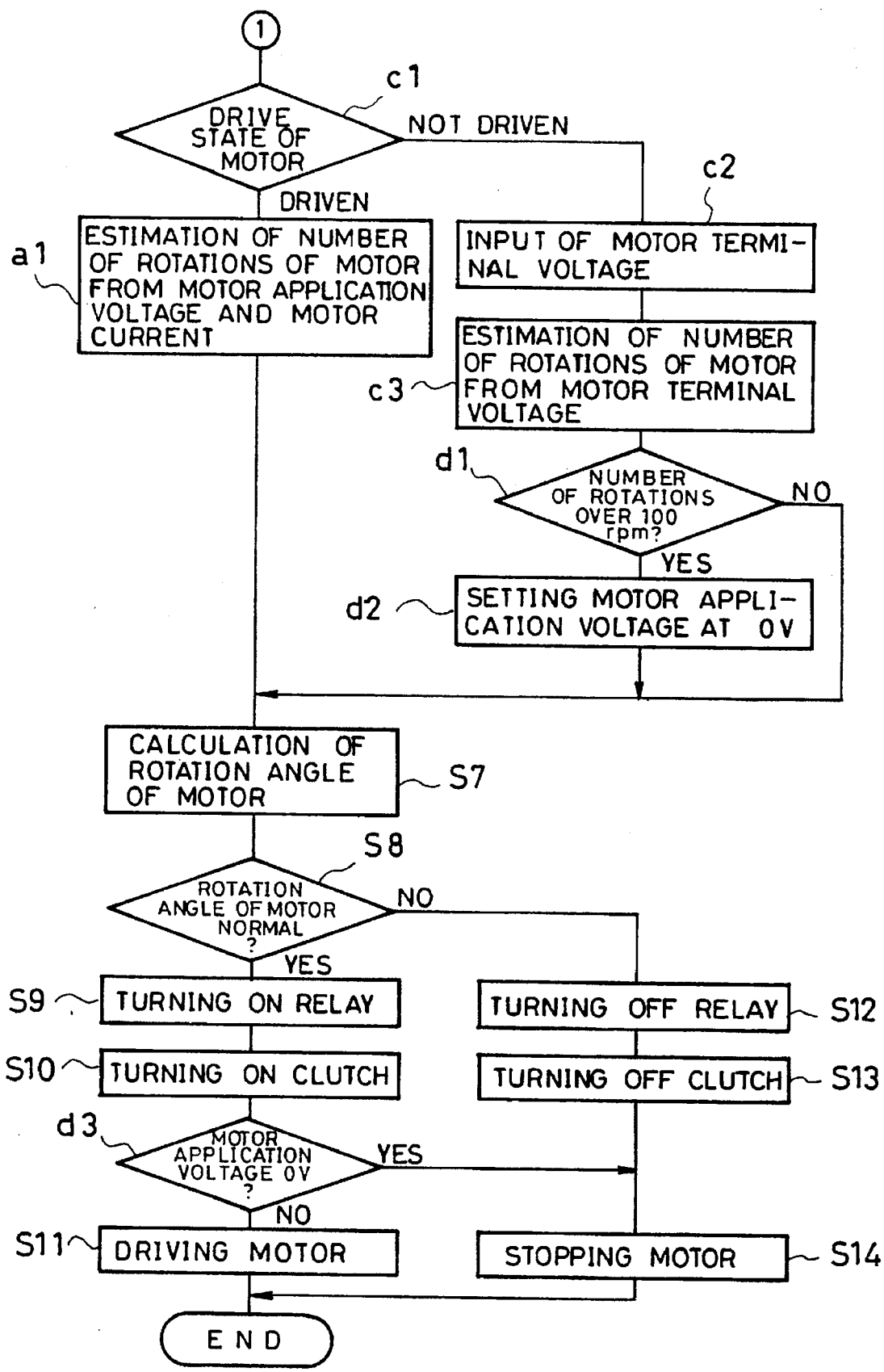
FIG. 17 is a flow chart explaining the operation of an electric power steering controller as a motor controller according to Embodiment 7 of the invention.

FIGS. 16 and 17 are flow charts showing the operation of an electric power steering controller as a motor controller according to Embodiment 7 of the invention. The entire configuration of this Embodiment 7 is shown in FIGS. 1, 3 or 13. In FIGS. 16 and 17, the same steps as in FIGS. 14 and 15 are given the same reference codes and their descriptions are omitted. In FIGS. 16 and 17, after a motor power voltage is input in step e1, the motor power voltage is filtered (step f1). The difference between the motor power voltage input in the step e1 and the motor power voltage filtered in the step f1 is obtained (step f2). It is determined whether the timer is set or not in step e2, and when the timer is cleared, it is determined whether the difference of the motor power voltage obtained in the step f2 falls below a predetermined value (3 V, for example) (step f3). Subsequent steps are the same as in Embodiment 6.

In this process, since it is possible to estimate whether the motor terminal or the like is grounded when a variation width of the motor power voltage exceeds a predetermined value (3 V, for example) within a predetermined time period determined by the time constant of the filter in the step f1, safety can be ensured by stopping the drive of the motor. Since a power voltage returns to a normal level by stopping the drive of the motor, it is possible to prevent the CPU 10 from being reset by a reduction in power voltage. In addition, with this process, it is possible to prevent a secondary fault that the elements of the motor drive circuit 14 are broken by grounding a motor cable or the like.

Embodiment 8

Figure 18:
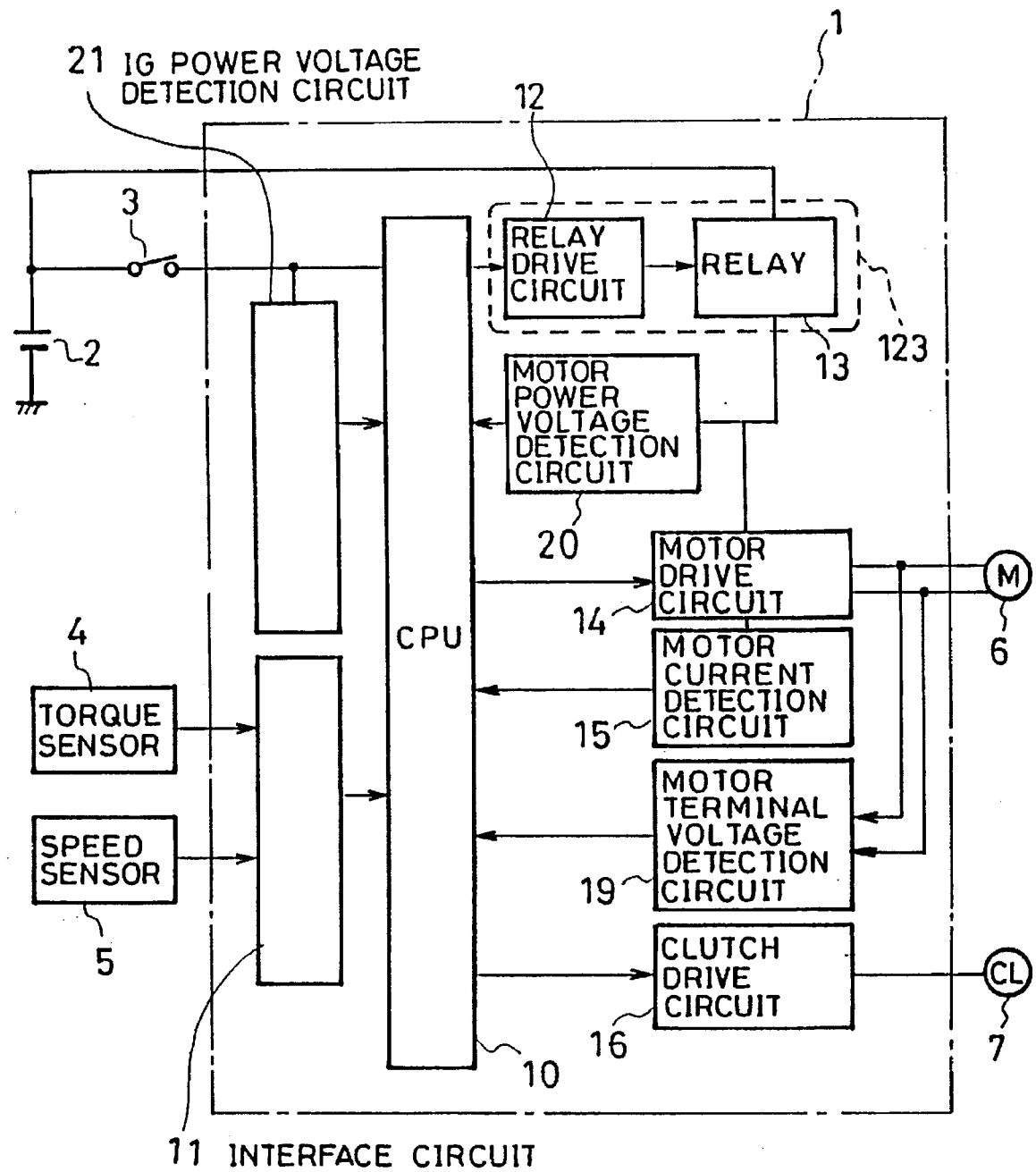
FIG. 18 is a block diagram of the substantial configuration of an electric power steering controller as a motor controller according to Embodiment 8 of the invention.

FIG. 18 is a block diagram of the substantial configuration of an electric power steering controller as a motor controller according to Embodiment 8 of the invention. In FIG. 18, the same or corresponding elements as those in FIG. 13 are given the same reference codes and their descriptions are omitted. In FIG. 18, reference numeral 21 represents an IG power voltage detection circuit for detecting an IG power voltage supplied to the control unit 1. As there is an impedance between power voltage detection points of the motor power detection circuit 20 and the IG power detection circuit 21, the IG power voltage is not stopped for such a long time as the motor power voltage even if the motor power voltage drops due to the grounding of the motor terminal, for example.

Figure 19:
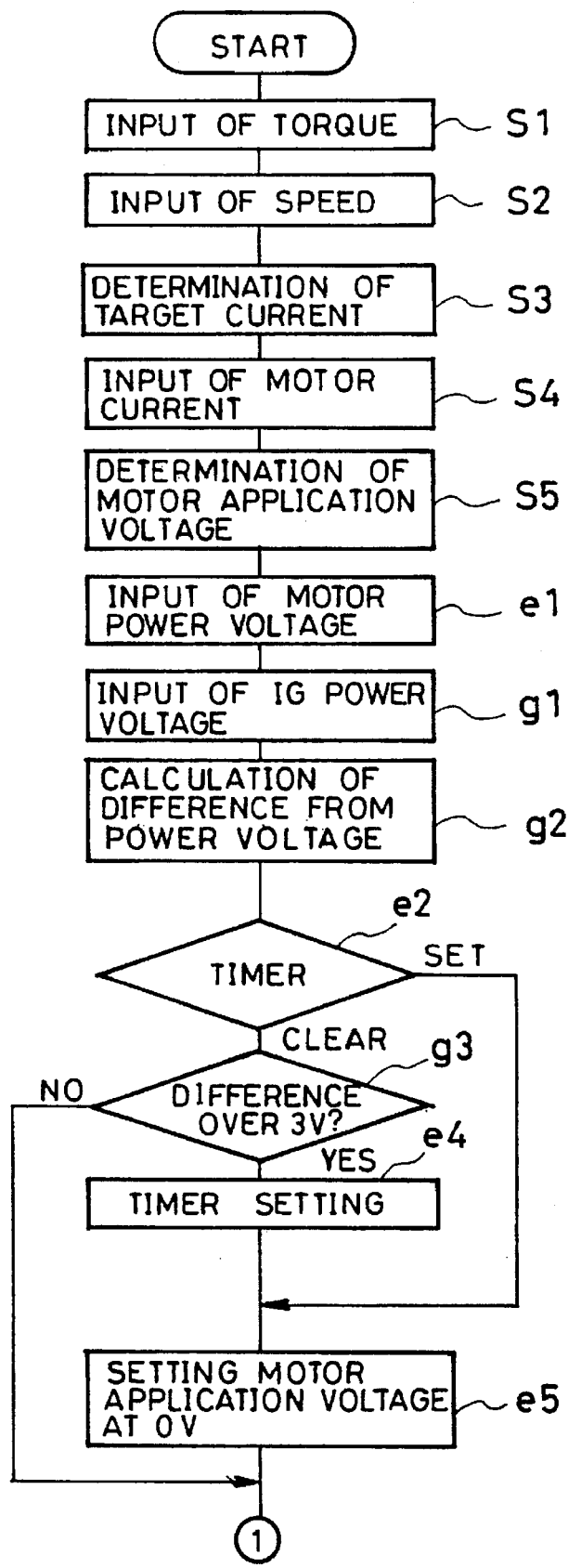
FIG. 19 is a flow chart explaining the operation of Embodiment 8.
Figure 20:
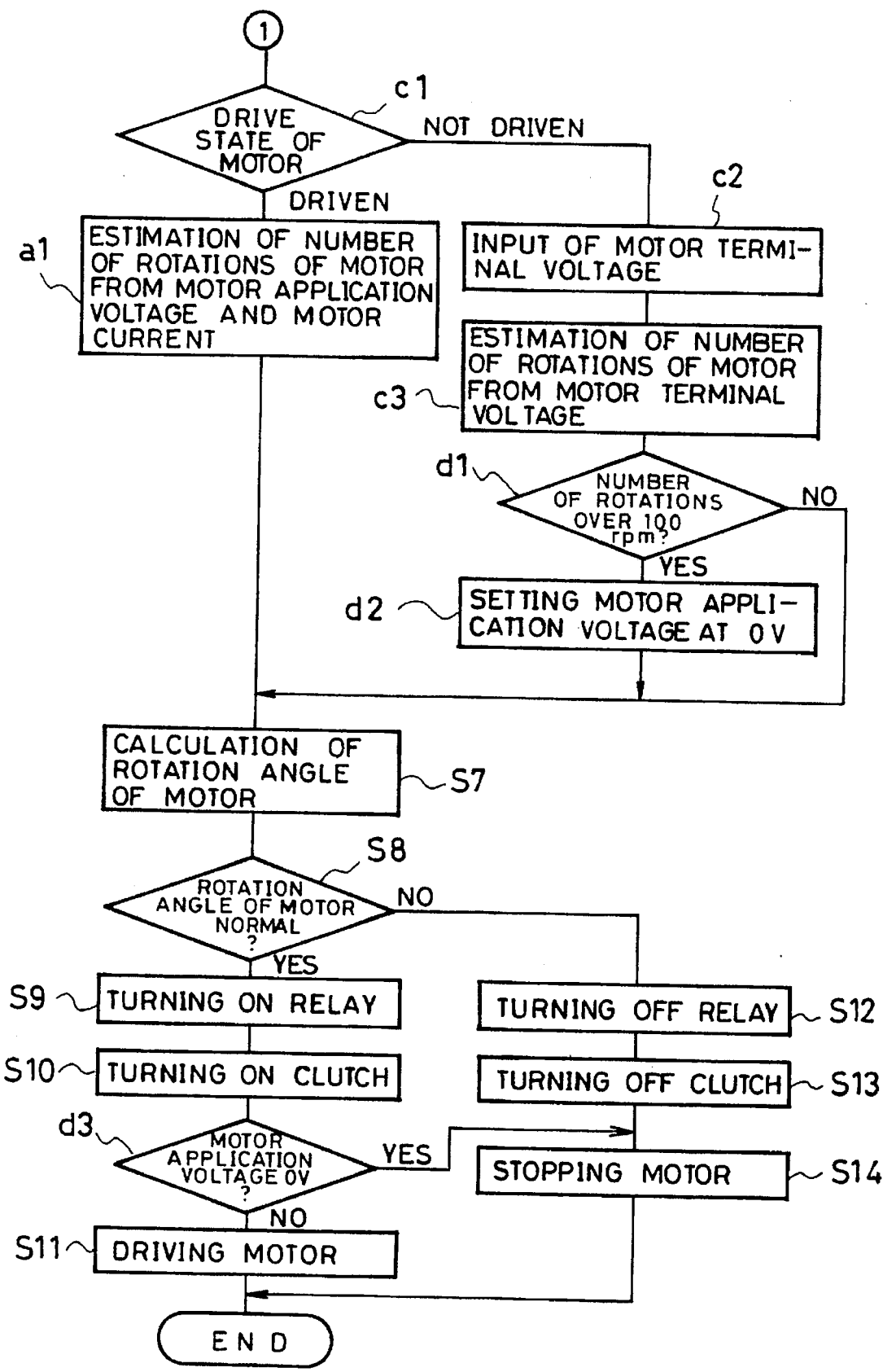
FIG. 20 is a flow chart explaining the operation of Embodiment 8.
Figure 21:
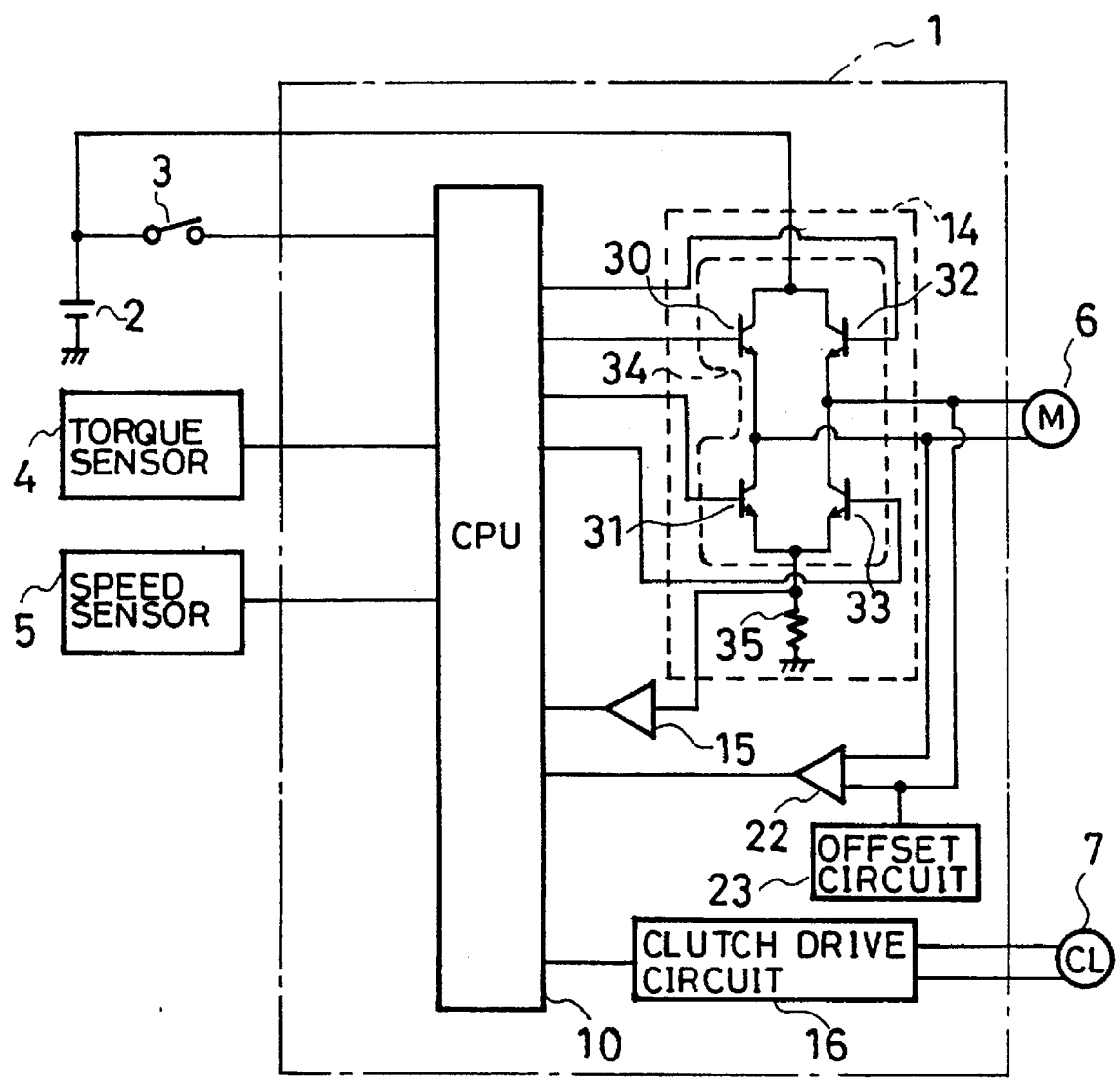
FIG. 21 is a block diagram of the substantial configuration of a prior art electric power steering controller.

A description is subsequently given of the operation of Embodiment 8 of the invention with reference to flow charts of FIGS. 19 and 20. In FIGS. 19 and 20, the same steps as in FIGS. 14 and 15 are given the same reference codes and their descriptions are omitted. In FIGS. 19 and 20, after a motor power voltage is input in step e1, an IG power voltage is input through the IG power voltage detection circuit 21 (step g1), and the difference between the motor power voltage and the IG power voltage is obtained (step g2). Thereafter, it is determined whether a timer to be described later is set or not (step e2). When the timer is cleared, it is determined whether the difference of the power voltage obtained in the step g2 is above a predetermined value (3 V, for example) (step g3). Subsequent steps are the same as in Embodiment 6.

In this process, since it is possible to estimate whether the motor terminal or the like is grounded when the difference of the power voltage obtained in the step g2 exceeds the predetermined value, safety can be ensured by stopping the drive of the motor. Since a power voltage returns to a normal level by stopping the drive of the motor, it is possible to prevent the CP 10 from being reset by a reduction in power voltage. In addition, with this process, it is possible to prevent a secondary fault that the elements of the motor drive circuit 14 are broken by grounding a motor cable or the like.

Embodiment 9

In Embodiment 9, the amount of motor rotation is calculated when the rotation speed of the motor exceeds a predetermined value (100 rpm, for example). This makes small an error in the detection of the amount of motor rotation caused by an error in the estimation of the rotation speed of the motor. The reason the error is made small by calculating the amount of motor rotation when the rotation speed of the motor is above a predetermined value is that there is a case where it is assumed that the motor rotates even when the motor does not rotate because there is an error in the estimation of the number of rotations of the motor as the rotation speed of the motor is estimated from a motor terminal voltage, motor current, motor application voltage and the like. In other words, when the amount of motor rotation is obtained regardless the rotation speed of the motor, there occurs a problem such as a change in the amount of motor rotation even if the motor does not rotate. However, when the rotation speed of the motor is above the predetermined value and the rotation degree of the motor is obtained, at least the motor rotates and the rotation degree of the motor changes according to the rotation of the motor. As a result, an error in the detection of the amount of motor rotation is made small.

Since the amount of motor rotation is not calculated when the rotation speed of the motor estimated from a motor current, motor application voltage, motor terminal voltage and the like is below a predetermined value, the rotation speed of the motor can be ignored when a leak of a level that does not affect control occurs due to waterdrops adhered to the motor terminal or the like. If waterdrops adhere to the motor terminal and the motor terminal is grounded (leaked) through the waterdrops, an ill effect, for example, the detection of a current smaller than a current running through the motor, is not given to a motor current detection value because contact resistance generated by the waterdrops is large enough (several MΩ).

As described on the foregoing pages, according to the present invention claimed in claim 1, the amount of motor rotation is obtained from the rotation speed of the motor, a fault is determined when the amount of motor rotation exceeds a predetermined value, and the drive of the motor is stopped. Therefore, a shock or the like caused by the connection of the clutch when the motor runs idle can be prevented, thus improving system reliability. In addition, since a fault in the motor rotation speed detection means can be detected, system safety is improved. Moreover, since a fault is determined by the amount of motor rotation, the drive of the motor is stopped immediately when a fault is serious. However, with regard to an insignificant fault, a predetermined time is required to determine a fault (to stop the drive of the motor), and if the motor returns to a normal state during this time, it continues its normal operation, thus improving system reliability and safety.

According to the invention claimed in claim 2, the rotation speed of the motor is estimated from a motor current detected by the motor current detection means and a motor application voltage applied to the motor by the motor drive means, a fault is determined when the amount of rotation obtained from the estimated rotation speed exceeds a predetermined value, and the drive of the motor is stopped. Therefore, a sensor for detecting the rotation speed of the motor is not required, thus making it possible to provide an inexpensive system. Moreover, when grounding, disconnection, or short-circuit of a motor cable, or a fault in the motor drive circuit or the motor current detection circuit (element destruction) occurs, the rotation speed of the motor is estimated to be higher than the actual rotation speed and, hence, the amount of motor rotation obtained from the rotation speed exceeds a predetermined value, thus stopping the drive of the motor. In other words, according to the invention claimed in claim 2, grounding, short-circuit and disconnection of a motor cable as well as faults in the motor drive circuit and the motor current detection circuit can be monitored by monitoring the amount of motor rotation with an estimated value of the rotation speed. Moreover, system safety is improved. Further, since a fault is determined by the amount of motor rotation, the drive of the motor is stopped immediately when a fault is serious. However, with regard to an insignificant fault, a predetermined time is required to determine a fault (stop the drive of the motor), and if it returns to a normal state during this time, it continues its normal operation, thus improving system reliability and safety.

According to the present invention claimed in claim 3, the rotation speed of the motor is estimated from a motor current detected by the motor current detection means and a motor application voltage detected by the motor application voltage detection means, a fault is determined when the amount of motor rotation obtained by this estimated rotation speed exceeds a predetermined value, and the drive of the motor is stopped. Therefore, a sensor for detecting the rotation speed of the motor can be eliminated, thus making it possible to provide an inexpensive system. Further, in a controller which comprises a motor current detection means using a motor current detection resistor provided on a motor current flow-in or flow-out side of the motor drive circuit which is constituted by a bridge circuit, for example, when grounding, disconnection or short-circuit of a motor cable, or a fault in the motor drive circuit or the motor current detection circuit (element destruction) occurs, the balance between a motor current detection value and a motor application voltage detection value is destroyed and the rotation speed of the motor is estimated to be higher than the actual rotation speed. As the result, the amount of motor rotation obtained from the rotation speed exceeds a predetermined value and, hence, the drive of the motor is stopped. In other words, according to the invention claimed in claim 3, grounding, short-circuit and disconnection of a motor cable, and faults in the motor drive circuit and the motor current detection circuit can be monitored by monitoring the amount of motor rotation with an estimated value of the rotation speed of the motor. Moreover, system safety is improved. Further, since a fault is determined by the amount of motor rotation, the drive of the motor is stopped when a fault is serious. However, with regard to an insignificant fault, a predetermined time is required to determine a fault (to stop the drive of the motor), and if the motor returns to a normal state during this time, it continues its normal operation, thus improving system reliability and safety.

According to the invention claimed in claim 4, the rotation speed of the motor is estimated from a motor terminal voltage detected by the motor terminal voltage detection means when the motor is not driven, a fault is determined when the amount of motor rotation obtained from this estimated rotation speed exceeds a predetermined value, and the drive of the motor is stopped, thus improving safety. If a motor terminal voltage becomes too high or too low in level due to grounding, disconnection or short-circuit of a motor cable, or a fault in the motor drive circuit or the motor terminal voltage detection circuit (element destruction) when the motor is not driven, it is determined that the motor rotates and the rotation speed is estimated. When the amount of rotation obtained from the rotation speed of the motor exceeds a predetermined value, a fault in the motor is determined and the drive of the motor is stopped. Therefore, according to the invention claimed in claim 4, since whether a fault in the motor or the like occurs or not is determined when the motor is not driven and the drive of the motor is stopped when a fault is determined, system safety and reliability are improved. Moreover, since a fault is determined based on the amount of motor rotation, the drive of the motor is stopped immediately when the fault is serious. However, with regard to an insignificant fault, a predetermined time is required to determine a fault (to stop the drive of the motor), and if the motor returns to a normal state during this time, it continues its normal operation, thus improving system reliability and safety.

According to the invention claimed in claim 5, the rotation speed of the motor is estimated from a motor terminal voltage detected by the motor terminal voltage detection means when the motor is not driven, and the drive of the motor is stopped when the estimated rotation speed exceeds a predetermined value. In other words, if a motor terminal voltage becomes too high or too low in level due to grounding, disconnection or short-circuit of a motor cable, or a fault in the motor drive circuit or the motor terminal voltage detection circuit (element destruction), it is determined that the motor rotates and the rotation speed is estimated. When the estimated rotation speed of the motor is above a predetermined value, the drive of the motor is stopped. As a result, when a fault such as grounding of the motor cable described above occurs, the amount of motor rotation obtained from the rotation speed of the motor exceeds a predetermined value, and the drive of the motor is stopped as a fault in the motor is determined. When the rotation speed of the motor falls below the predetermined value, the drive of the motor is made possible. Therefore, according to the invention claimed in claim 5, whether a fault in the motor or the like occurs or not is determined each time the motor is not driven and the drive of the motor is stopped when a fault is determined, thus improving system safety and reliability.

According to the invention claimed in claim 6, when a power voltage detected by the power voltage detection means falls below a predetermined value, the drive of the motor is stopped for a predetermined time period. In other words, since the drive of the motor is stopped for a predetermined time period when a power voltage drops due to grounding of a motor cable or the like, a fault in the motor is detected and the drive of the motor is stopped according to the invention claimed in claim 4 or 5. Further, since the drive of the motor is stopped for a predetermined time period when a power voltage drops, it is possible to prevent the CPU from being reset by a reduction in power voltage. As the result, system safety and reliability are improved. Moreover, after an elapse of a predetermined time when the motor is in order, the motor can be redriven, thus making it possible to prevent a reduction in system performance caused by the halt of the motor and improve system reliability.

According to the invention claimed in claim 7, there is provided filtering means for filtering a power voltage detected by the power voltage detection means so that when the difference between a power voltage detected by the power voltage detection means and a power voltage filtered by the filtering means is above a predetermined value, the drive of the motor is stopped for a predetermined time period. In other words, when a variation width of the power voltage is larger than a variation width of the filtered power voltage by the predetermined value, the drive of the motor is stopped for the predetermined time period. Therefore, the drive of the motor is not stopped by a slow change in power voltage caused by a variation in load or the like connected to a power source. However, the drive of the motor is stopped by a sharp change in power voltage caused by grounding of a motor cable or the like. A fault in the motor is detected according to the invention claimed in claim 4 during the halt of the motor and the drive of the motor is stopped. In this way, since the invention claimed in claim 7 stops the drive of the motor due to a sharp change in power line, the drive of the motor is stopped only when a fault such as grounding of a motor cable occurs. As a result, system safety and reliability are improved. Moreover, since the drive of the motor is stopped for a predetermined time period when a power voltage changes by the above-described predetermined value, it is possible to prevent the CPU from being reset by a reduction in power voltage. Further, since the drive of the motor is stopped for the predetermined time period only, a reduction in system performance caused by the halt of the motor can be prevented when the motor is in order.

According to the invention claimed in claim 8, when a motor power voltage detected by the motor power voltage detection means is larger than a control power voltage detected by the control power voltage detection means by a predetermined value, the drive of the motor is stopped for a predetermined time period. In other words, since a power voltage is monitored at two different points which differ in power supply destination, one monitor voltage is little affected thanks to an impedance between these two monitor points even if the other monitor voltage is varied by grounding or the like. Therefore, if a motor power voltage decreases due to grounding of a motor cable or the like and the difference between a motor power voltage and a control power voltage exceeds a predetermined value, the drive of the motor is stopped for a predetermined time period and, hence, a fault in the motor can be detected during the halt of the motor according to the invention claimed in claim 4. Moreover, since the drive of the motor is stopped for a predetermined time period when the difference of the power voltage exceeds the predetermined value, it is possible to prevent the CPU from being reset by a reduction in power voltage. Further, since the drive of the motor is stopped for the predetermined time period only, it is possible to prevent a reduction in system performance caused by the halt of the motor when the motor is in order. Moreover, since a motor power voltage is compared with a control power voltage, it is possible to prevent the halt of the motor caused by noises in power line, thus improving system reliability.

According to the invention claimed in claim 9, since the amount of motor rotation is calculated when the rotation speed of the motor exceeds a predetermined value, erroneous detection of the amount of motor rotation can be prevented, thus improving system reliability. Moreover, when the rotation speed of the motor estimated from a motor current, a motor application voltage, a motor terminal voltage or the like falls below a predetermined value, the amount of motor rotation is not calculated. In other words, since the rotation speed of the motor is ignored when a leak current of a level that does not affect control due to waterdrops adhered to the motor terminal or the like occurs, the system can be controlled efficiently.

What is claimed is:

1. In a motor-driven electric power steering controller, a motor controller comprising:

a motor whose allowable amount of rotation is limited in order to help control a steering wheel set at a fixed rotation degree, motor rotation speed detection means for detecting the rotation speed of said motor, motor drive means for driving said motor, motor rotation amount calculating means for calculating the amount of rotation of said motor from the rotation speed of said motor, and motor stopping means for determining a fault when the amount of rotation of said motor exceeds a predetermined rotation amount value and for stopping the drive of said motor.

2. The motor controller according to claim 1, wherein the amount of rotation of said motor is calculated when the rotation speed of said motor exceeds a predetermined rotation speed value.

3. In a motor-driven electric power steering controller, a motor controller, comprising:

a motor whose allowable amount of rotation is limited, motor current detection means for detecting a current running through said motor, motor application voltage determination means for determining a voltage to be applied to said motor, motor drive means for driving said motor by applying an application voltage determined by said motor application determination means, rotation speed estimation means for estimating the rotation speed of said motor from a motor current detected by said motor current detection means and from a motor application voltage applied to said motor by said motor drive means, motor rotation amount calculating means for calculating the amount of rotation of said motor from the estimated rotation speed, and motor stopping means for determining a fault when the amount of rotation of said motor exceeds a predetermined rotation amount value and for stopping the drive of said motor.

4. The motor controller according to claim 3, wherein the amount of rotation of said motor is calculated when the rotation speed of said motor exceeds a predetermined rotation speed value.

5. The motor controller according to claim 4, wherein said motor stopping means also stops the drive of said motor when the rotation speed of said motor, estimated from said motor terminal voltage detected when said motor is not driven, exceeds a predetermined value.

6. In a motor-driven electric power steering controller, a motor controller, comprising:

a motor whose allowable amount of rotation is limited, motor current detection means for detecting a current running through said motor, motor application voltage detection means for detecting a voltage applied to said motor, motor drive means for driving said motor, motor rotation speed estimation means for estimating the rotation speed of said motor from a motor current detected by said motor current detection means and from a motor application voltage detected by said motor application voltage detection means, motor rotation amount calculating means for calculating the amount of rotation of said motor from the estimated rotation speed, and motor stopping means for determining a fault when the amount of rotation of said motor exceeds a predetermined rotation amount value and for stopping the drive of said motor.

7. The motor controller according to claim 6, wherein the mount of rotation of said motor is calculated when the rotation speed of said motor exceeds a predetermined rotation speed value.

8. In a motor-driven electric power steering controller, a motor controller, comprising:

a motor whose allowable mount of rotation is limited, motor bias means for biasing said motor at a constant voltage, motor terminal voltage detection means for detecting a terminal voltage of said motor biased by said motor bias means, motor drive means for driving said motor, motor rotation speed estimation means for estimating the rotation speed of said motor from a motor terminal voltage detected by said motor terminal voltage detection means when said motor is not driven, motor rotation mount calculating means for calculating the amount of rotation of said motor from the estimated rotation speed, and motor stopping means for determining a fault when the mount of rotation of said motor exceeds a predetermined rotation mount value and for stopping the drive of said motor.

9. The motor controller according to claim 8, wherein the amount of rotation of said motor is calculated when the rotation speed of said motor exceeds a predetermined rotation speed value.

10. In a motor-driven electric power steering controller, a motor controller, comprising:

a motor whose allowable amount of rotation is limited, motor power voltage detection means for detecting a motor power voltage of said motor, motor drive means for driving said motor, and motor stopping means for stopping the drive of said motor for a predetermined time period when said motor power voltage falls below a predetermined value.

11. In a motor-driven electric power steering controller, a motor controller, comprising:

a motor whose allowable amount of rotation is limited, motor power voltage detection means for detecting a motor power voltage of said motor, motor drive means for driving said motor, filtering means for filtering said motor power voltage to provide a filtered motor power voltage, and motor stopping means for stopping the drive of said motor for a predetermined time period when the difference between said motor power voltage and said filtered motor power voltage exceeds a predetermined value.

12. In a motor-driven electric power steering controller, a motor controller, comprising:

a motor whose allowable mount of rotation is limited, motor power voltage detection means for detecting a motor power voltage of said motor, control power voltage detection means for detecting a control power voltage of a control unit, motor drive means for driving said motor, and motor stopping means for stopping the drive of said motor for a predetermined time period when said motor power voltage is larger than said control power voltage by a predetermined value.

* * * * *